US009433011B2

(12) United States Patent
Hwang et al.

(10) Patent No.: US 9,433,011 B2
(45) Date of Patent: Aug. 30, 2016

(54) APPARATUS AND METHODS OF BLUETOOTH AND WIRELESS LOCAL AREA NETWORK COEXISTENCE

(71) Applicant: QUALCOMM Incorporated, San Diego, CA (US)

(72) Inventors: Insoo Hwang, San Diego, CA (US); Soumya Das, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 14/061,320

(22) Filed: Oct. 23, 2013

(65) Prior Publication Data

US 2015/0111610 A1    Apr. 23, 2015

(51) Int. Cl.
| | |
|---|---|
| H04M 1/00 | (2006.01) |
| H04W 72/12 | (2009.01) |
| H04W 88/06 | (2009.01) |
| H04W 74/08 | (2009.01) |
| H04W 4/00 | (2009.01) |
| H04W 16/14 | (2009.01) |

(52) U.S. Cl.
CPC ..... *H04W 72/1215* (2013.01); *H04W 74/0816* (2013.01); *H04W 88/06* (2013.01); *H04W 4/008* (2013.01); *H04W 16/14* (2013.01)

(58) Field of Classification Search
None
See application file for complete search history.

(56) References Cited

U.S. PATENT DOCUMENTS

| 7,715,434 B2 * | 5/2010 | Fischer | H04W 88/06 370/469 |
|---|---|---|---|
| 7,734,253 B2 | 6/2010 | Chen et al. | |
| 7,801,099 B2 * | 9/2010 | Desai | H04W 52/267 370/338 |
| 7,826,411 B2 * | 11/2010 | Gonikberg | H04W 8/005 370/328 |
| 8,068,871 B2 * | 11/2011 | Xhafa | H04W 16/14 455/552.1 |
| 8,072,913 B2 * | 12/2011 | Desai | H04W 52/0225 370/311 |
| 8,155,695 B2 | 4/2012 | Wang et al. | |
| 8,184,582 B2 * | 5/2012 | Banerjee | H04W 16/14 370/329 |
| 8,249,031 B1 * | 8/2012 | Hirsch | H04W 72/1215 370/336 |
| 8,265,563 B2 * | 9/2012 | Beninghaus | H04B 1/3805 370/329 |
| 8,548,386 B1 * | 10/2013 | Zhou | H04B 7/0408 455/41.2 |
| 8,831,655 B2 * | 9/2014 | Burchill | H04W 52/243 370/310 |
| 8,929,259 B2 * | 1/2015 | Banerjee | H04W 16/14 370/278 |
| 2005/0276241 A1 | 12/2005 | Kamerman et al. | |
| 2006/0292987 A1 | 12/2006 | Ophir et al. | |
| 2009/0196210 A1 | 8/2009 | Desai | |
| 2009/0238158 A1 | 9/2009 | Lewis | |
| 2012/0218979 A1 | 8/2012 | Yeh et al. | |

OTHER PUBLICATIONS

International Search Report and Written Opinion—PCT/US2014/060730—ISA/EPO—Apr. 24, 2015.

* cited by examiner

*Primary Examiner* — Tuan A Tran
(74) *Attorney, Agent, or Firm* — Loza & Loza LLP

(57) ABSTRACT

Aspects of the present disclosure are directed to apparatuses and methods that can improve Bluetooth (BT) and Wireless Local Area Network (WLAN) coexistence at a BT/WLAN co-located wireless communication device. Various coexistence schemes are provided such as dynamic WLAN fragmentation based on high priority BT traffic by utilizing various techniques and signaling schemes. In some aspects of the disclosure, narrow-band active interference cancellation may be combined with dynamic WLAN fragmentation to further improve BT/WLAN coexistence performance.

7 Claims, 20 Drawing Sheets

APPARATUS AND METHODS OF BLUETOOTH AND WIRELESS LOCAL AREA NETWORK COEXISTENCE

TECHNICAL FIELD

Aspects of the present disclosure relate generally to wireless communication systems, and more particularly, to apparatuses and methods for Bluetooth and Wireless Local Area Network coexistence.

BACKGROUND

Bluetooth (BT) and wireless local area network (WLAN) in the 2.4 GHz industrial, scientific and medical (ISM) band share the same unlicensed frequency medium. As the two technologies are developed under different standard bodies, the coordination of BT/WLAN for avoiding interference has become important and been attempted in many domains including frequency, power, and time afterwards. Frequency domain techniques include adaptive frequency hopping (AFH), and power domain techniques include power backoff or de-boosting. Time domain techniques include some form of frame alignment. The actual implementation of these techniques is difficult because they require close coordination between the two wireless technologies. Further, active interference cancellation (AIC) has been investigated, but prior AIC implementations have various limitations in case of wideband interference due to group delay and frequency selectivity of the wideband coupling channel.

As many communication devices, especially handheld devices, are equipped with both BT and WLAN, the coordination between the two technologies has become more important. Therefore, coexistence solutions to enable concurrent transmission and reception are desirable. For instance, when a device is transmitting on BT while receiving on WLAN, the received WLAN signal can be de-sensed due to high self-interference caused by the close proximity of the BT transmitter. In the case where the device is transmitting on WLAN while receiving on BT, similar interference problem can occur. Interference coordination between WLAN signal and BT signal has become more important because many BT traffic is delay sensitive (e.g., phone call or audio streaming), and WLAN is being used for voice traffic (e.g., VOIP). Thus, novel coordination techniques for BT and WLAN coexistence taking into consideration of signal prioritization are greatly desired.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to apparatuses and methods that can improve Bluetooth (BT) and Wireless Local Area Network (WLAN) coexistence at a BT/WLAN co-located wireless communication device. Various coexistence schemes are provided such as dynamic WLAN fragmentation based on high priority BT traffic by utilizing various techniques and signaling schemes. In some aspects of the disclosure, narrow-band active interference cancellation may be combined with dynamic WLAN fragmentation to further improve BT/WLAN coexistence performance. However, the present disclosure is not limited to BT and WLAN, and may be applied to other wireless communication standards.

In one aspect, the disclosure provides a method of wireless communication operable at a communication device. The communication device receives first data utilizing a first wireless transceiver corresponding to a first communication protocol, dynamically fragments one or more data frames of second data into a plurality of fragmented frames based on a medium access timing of the first data, and transmits the fragmented second data utilizing a second wireless transceiver corresponding to a second communication protocol, while avoiding collision between the first data and the second data.

In various aspects of the disclosure, the first data may have higher priority than the second data. The first communication protocol may include a piconet protocol, and the second communication protocol may include a wireless local area network protocol. The method may further include avoiding transmitting a media access control layer protocol data unit utilizing the second transceiver while receiving the first data. The method may further include dynamically varying a size of a PHY Layer Convergence Procedure (PLCP) Protocol Data Unit of the fragmented frames based on a channel condition for transmitting the second data. The method may further include dynamically changing a data rate or modulation of the fragmented frames based on a channel condition for transmitting the second data.

Another aspect of the disclosure provides a method of wireless communication operable at a communication device. The communication device transmits first data utilizing a first wireless transceiver corresponding to a first communication protocol, transmits a fragmentation request to an access point to dynamically fragment one or more data frames of second data into a plurality of fragmented frames based on a medium access timing of the first data, and receives the fragmented second data utilizing a second transceiver corresponding to a second communication protocol, while avoiding collision between the first data and the second data.

In various aspects of the disclosure, the first data may have higher priority than the second data. The first communication protocol may include a piconet protocol, and the second communication protocol may include a wireless local area network protocol. The fragmentation request may be configured to trigger the access point to adjust a fragmentation threshold. The fragmentation request may be configured to request the access point to avoid transmitting the fragmented second data during the transmission of the first data. Sending a fragmentation request may include sending a clear-to-send (CTS) frame including the fragmentation request in response to a request-to-send (RTS) frame received from the access point. The method may further include adjusting the transmission of the first data based on the fragmentation of the second data. The fragmentation request may be configured to request the access point to avoid transmitting a media access control layer protocol data unit (MPDU) during the transmission of the first data. The method may further include adjusting the transmission of the first data based on a measured signal to interference ratio of the received second data. Adjusting the transmission of the first data may include at least one of: reducing a transmission power of the first data; or performing active interference cancellation to mitigate an interference imposed on the second data by the first data.

Another aspect of the disclosure provides a method of wireless communication operable at a communication device. The communication device transmits first data utilizing a first wireless transceiver corresponding to a first communication protocol, communicates a medium access timing of the first data to an access point by utilizing a second wireless transceiver corresponding to a second communication protocol, sets the second wireless transceiver to a sleep mode, and wakes up the second wireless transceiver to receive second data from an access point when the first wireless transceiver is not transmitting data based on the medium access timing. The received second data was queued at the access point when the second wireless transceiver was in the sleep mode.

In various aspects of the disclosure, the first communication protocol may include a piconet protocol, and the second communication protocol may include a wireless local area network protocol. The method may further include receiving a traffic indication map (TIM) from the access point, wherein the TIM indicates that at least one packet of the second data is queued at the access point. The method may further include transmitting a power save poll to the access point in response to receiving the TIM, utilizing the second wireless transceiver. The method may further include receiving a delivery traffic indication message (DTIM) from the access point, wherein the DTIM indicates the second data is broadcast data. The method may further include adjusting the transmission of the first data based on a measured signal to interference ratio of the received second data. Adjusting the transmission of the first data may include at least one of: reducing a transmission power of the first data; or performing active interference cancellation to mitigate an interference imposed on the second data by the first data.

Another aspect of the disclosure provides a method of wireless communication operable at a wireless access point. The wireless access point transmits first data to a communication device by utilizing a first wireless medium, receives a fragmentation request from the communication device to dynamically fragment one or more data frames of the first data into a plurality of fragmented frames, and transmits the fragmented first data during a predetermined period indicated by the fragmentation request while avoiding collision between the first fragmented data and a second data transmitted by the communication device utilizing a second wireless medium.

In various aspects of the disclosure, the method may further include adjusting a fragmentation threshold based on the fragmentation request. The method may further include adjusting a transmit power of the first data in response to the fragmentation request. The method may further include changing a modulation of the fragmented data. The method may further include avoiding transmitting a media access control layer protocol data unit during a predetermined period indicated by the fragmentation request. Receiving a fragmentation request may include receiving a clear-to-send (CTS) frame including the fragmentation request in response to a previously sent request-to-send (RTS) frame. The method may further include transmitting a delivery traffic indication message (DTIM) indicating the availability of the first data during the predetermined period. The method may further include: transmitting a traffic indication map (TIM) indicating the availability of the first data queued at the access point; receiving a power saving poll (PS-poll) from the communication device; and transmitting the fragmented first data to the communication device during the predetermined period in response to the PS-poll.

Another aspect of the disclosure provides an apparatus for wireless communication. The apparatus includes: at least one processor; a first wireless transceiver coupled to the at least one processor, corresponding to a first communication protocol; a second wireless transceiver coupled to the at least one processor, corresponding to a second communication protocol; and a memory coupled to the at least one processor. A first component of the at least one processor is configured to utilize the first wireless transceiver to receive first data. A second component of the at least one processor is configured to dynamically fragment one or more data frames of second data into a plurality of fragmented frames based on a medium access timing of the first data. A third component of the at least one processor is configured to utilize the second wireless transceiver to transmit the fragmented second data, while avoiding collision between the first data and the second data.

In various aspects of the disclosure, the first data may have higher priority than the second data. The first protocol may include a piconet protocol, and the second protocol may include a wireless local area network protocol. The at least one processor may further include a fourth component configured to control the second transceiver to avoid transmitting a media access control layer protocol data unit while receiving the first data. The at least one processor may further include a fourth component configured to dynamically vary the size of a PHY Layer Convergence Procedure (PLCP) Protocol Data Unit of the fragmented frames based on a channel condition for transmitting the second data. The at least one processor may further include a fourth component configured to dynamically change a data rate or modulation of the fragmented frames based on a channel condition for transmitting the second data.

Another aspect of the disclosure provides an apparatus for wireless communication. The apparatus includes at least one processor; a first wireless transceiver coupled to the at least one processor, corresponding to a first communication protocol; a second wireless transceiver coupled to the at least one processor, corresponding to a second communication protocol; and a memory coupled to the at least one processor. A first component of the at least one processor is configured to utilize the first wireless transceiver to transmit first data. A second component of the at least one processor is configured to utilize the second wireless transceiver to send a fragmentation request to an access point to dynamically fragment one or more data frames of second data into a plurality of fragmented frames based on a medium access timing of the first data. A third component of the at least one processor is configured to utilize the second wireless transceiver to receive the fragmented second data, while avoiding collision between the first data and the second data.

In various aspects of the disclosure, the first data may have higher priority than the second data. The first protocol may include a piconet protocol, and the second protocol may include a wireless local area network protocol. The fragmentation request may be configured to trigger the access point to adjust a fragmentation threshold. The fragmentation request may be configured to request the access point to avoid transmitting the fragmented second data during the transmission of the first data. For sending the fragmentation request, the second component may include a fourth component configured to send a clear-to-send (CTS) frame including the fragmentation request in response to a request-to-send (RTS) frame received from the access point. The at least one processor may further include a fourth component configured to adjust the transmission of the first data based on the fragmentation of the second data. The fragmentation request may be configured to request the access point to avoid transmitting a media access control layer protocol data unit (MPDU) during the transmission of the first data. The at least one processor may further include a fourth component configured to: measure a signal to interference ratio of the received second data; and adjust the transmission of the first data based on the measured signal to interference ratio of the received second data. The fourth component may be further configured to, at least one of: reduce a transmission power of the first data; or perform active interference cancellation to mitigate an interference imposed on the second data by the first data. Another aspect of the disclosure provides an apparatus for wireless communication. The apparatus includes: at least one processor; a first wireless transceiver coupled to the at least one processor, corresponding to a first communication protocol; a second wireless transceiver coupled to the at least one processor, corresponding to a second communication protocol; and a memory coupled to the at least one processor. A first component of the at least one processor is configured to utilize the first wireless transceiver to transmit first data. A second component of the at least one processor is configured to utilize the second wireless transceiver to communicate a medium access timing of the first data to an access point. A third component of the at least one processor is configured to set the second wireless transceiver to a sleep mode. A fourth component of the at least one processor is configured to wake up the second wireless transceiver to receive second data from the access point when the first wireless transceiver is not transmitting data based on the medium access timing, wherein the received second data was queued at the access point when the second wireless transceiver was in the sleep mode.

In various aspects of the disclosure, the first protocol may include a piconet protocol, and the second protocol may include a wireless local area network protocol. The at least one processor may further include a fifth component configured to receive a traffic indication map (TIM) from the access point, wherein the TIM indicates that at least one packet of the second data is queued at the access point. The at least one processor may further include a sixth component configured to transmit a power save poll to the access point in response to receiving the TIM, utilizing the second wireless transceiver. The at least one processor may further include a fifth component configured to receive a delivery traffic indication message (DTIM) from the access point, wherein the DTIM indicates the second data is broadcast data. The at least one processor may further include a fifth component configured to: measure a signal to interference ratio of the received second data; and adjust the transmission of the first data based on the measured signal to interference ratio of the received second data. The fifth component may be further configured to, at least one of: reduce a transmission power of the first data; or perform active interference cancellation to mitigate an interference imposed on the second data by the first data.

Another aspect of the disclosure provides a wireless access point. The wireless access point includes: at least one processor; a wireless transceiver coupled to the at least one processor, corresponding to a first communication protocol; and a memory coupled to the at least one processor. A first component of the at least one processor is configured to utilize the wireless transceiver to transmit first data to a communication device, utilizing a first wireless medium. A second component of the at least one processor is configured to receive a fragmentation request from the communication device to dynamically fragment one or more data frames of the first data into a plurality of fragmented frames. A third component of the at least one processor is configured to transmit the fragmented first data during a predetermined period indicated by the fragmentation request, while avoiding collision between the first fragmented data and a second data transmitted by the communication device utilizing a second wireless medium.

In various aspects of the disclosure, the access point may further include a fourth component configured to adjust a fragmentation threshold based on the fragmentation request. The access point may further include a fourth component configured to boost a transmit power of the first data in response to the fragmentation request. The access point may further include a fourth component configured to change a modulation of the fragmented data. The access point may further include a fourth component configured to avoid transmitting a media access control layer protocol data unit during a predetermined period indicated by the fragmentation request. The second component may be further configured to receive a clear-to-send (CTS) frame including the fragmentation request in response to a previously sent request-to-send (RTS) frame. The access point may further include a fourth component configured to transmit a delivery traffic indication message (DTIM) indicating the availability of the first data during the predetermined period. The third component may be configured to: transmit a traffic indication map (TIM) indicating the availability of the first data queued at the access point; receive a power saving poll (PS-poll) from the communication device; and transmit the fragmented first data to the communication device during the predetermined period in response to the PS-poll.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
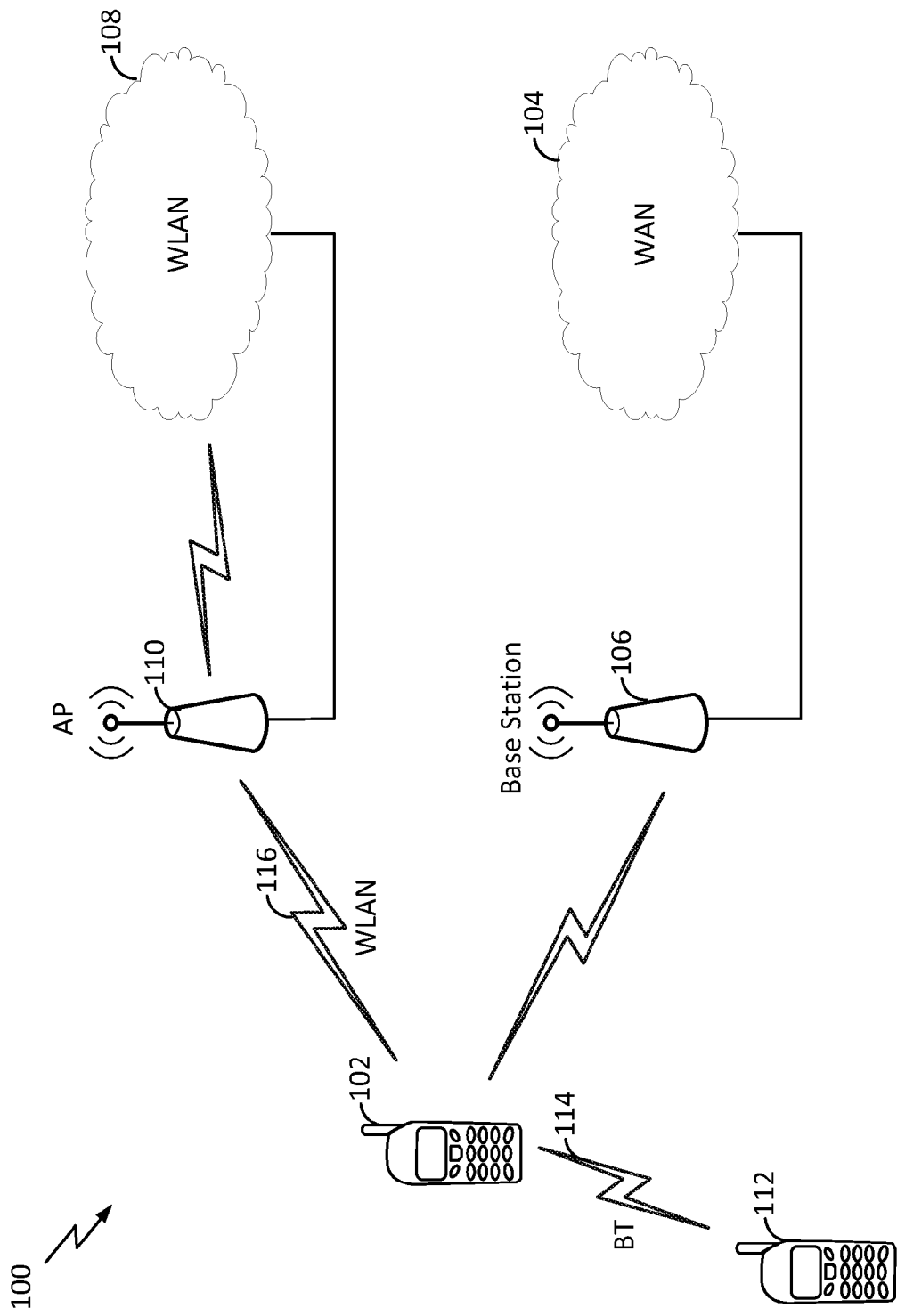
FIG. 1 is a conceptual diagram illustrating a communication system including a first communication device capable of communicating in both BT and WLAN in accordance with an aspect of the present disclosure.

Aspects of the present disclosure provide for a number of Bluetooh (BT)/wireless local area network (WLAN) coexistence techniques using dynamic WLAN frame fragmentation and active narrow band interference cancellation. FIG. 1 is a diagram conceptually illustrating a communication system 100 including a first communication device 102 capable of communicating on both BT and WLAN in accordance with an aspect of the present disclosure. Referring to FIG. 1, a communication device 102 is configured to communicate on a wide area network (WAN) 104 through a base station (BS) 106, and a WLAN 108 through an access point (AP) 110. In an aspect of the disclosure, the WAN may be a Universal Mobile Telecommunications System (UMTS) network or a CDMA2000 network. In an aspect of the disclosure, the WLAN 108 employs widely used networking protocols such as the IEEE 802.11 wireless protocol family (WiFi). In addition, the communication device 102 is configured to communicate with a second communication device 112 via a BT connection 114 based on a piconet protocol. However, the present disclosure is not limited to the communication devices shown in FIG. 1. A non-exhaustive list of the communication devices 102 and 112 includes smartphone, smart watch, mobile phone, personal digital assistant, portable computer, tablet computer, desktop computer, digital printer, wireless speaker, multimedia player, digital camera, camcorder, network card, etc.

In an aspect of the disclosure, the communication device 102 may be configured to simultaneously communicate with other devices using both WLAN and BT. For example, the first communication device 102 may simultaneously communicate with the AP 110 and the second communication device 112 using WLAN and BT connections, respectively. In some applications, BT traffic has higher priority than WLAN traffic and is delay-sensitive. For example, the BT connection may be an extended synchronous connections orientated (eSCO) link for voice call or an asynchronous connection-less (ACL) link for music streaming (e.g., A2DP). To protect high priority BT traffic, the WLAN traffic 116 needs to be coordinated to avoid or reduce any overlap with the BT traffic 114 in the time domain. Because the BT and WLAN transceivers are collocated, the communication device 102 has knowledge on what data is being received on BT while transmitting data on WLAN. Similarly, the communication device 102 has knowledge on what data is being transmitted on BT while receiving data on WLAN.

Figure 2:
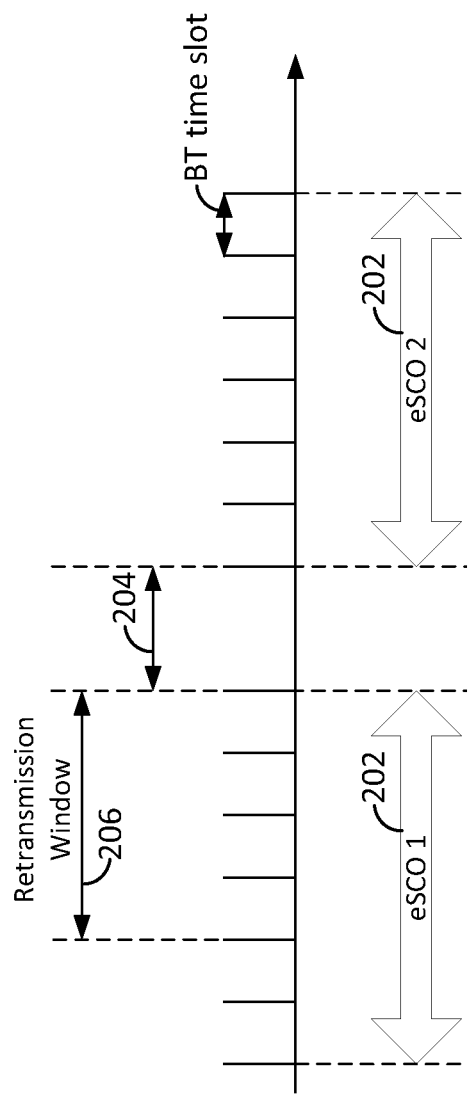
FIG. 2 is a conceptual diagram illustrating two Bluetooth extended synchronous connections orientated (eSCO) frames.

In aspects of the disclosure, WLAN data to/from the device 102 can be dynamically fragmented to avoid the high priority BT traffic (e.g., periodic or aperiodic BT traffic), for example, between the devices 102 and 112. Fragmentation can be done dynamically depending on the timing or periodicity of BT traffic. For example, referring to FIG. 2, eSCO packets 202 are transmitted in predetermined time slots (e.g., 6 BT slots each for eSCO). The regular interval 204 between the eSCO packets is specified when the BT link is established. The eSCO packets 202 to/from a specific slave device (e.g., device 112 in FIG. 1) are acknowledged, and may be retransmitted if not acknowledged during a retransmission window 206. In addition, audio may be streamed between the devices 102 and 112 using an ACL link (A2DP profile). The ACL link can occupy 1, 3, or 5 BT slots for data or voice.

Figure 3:
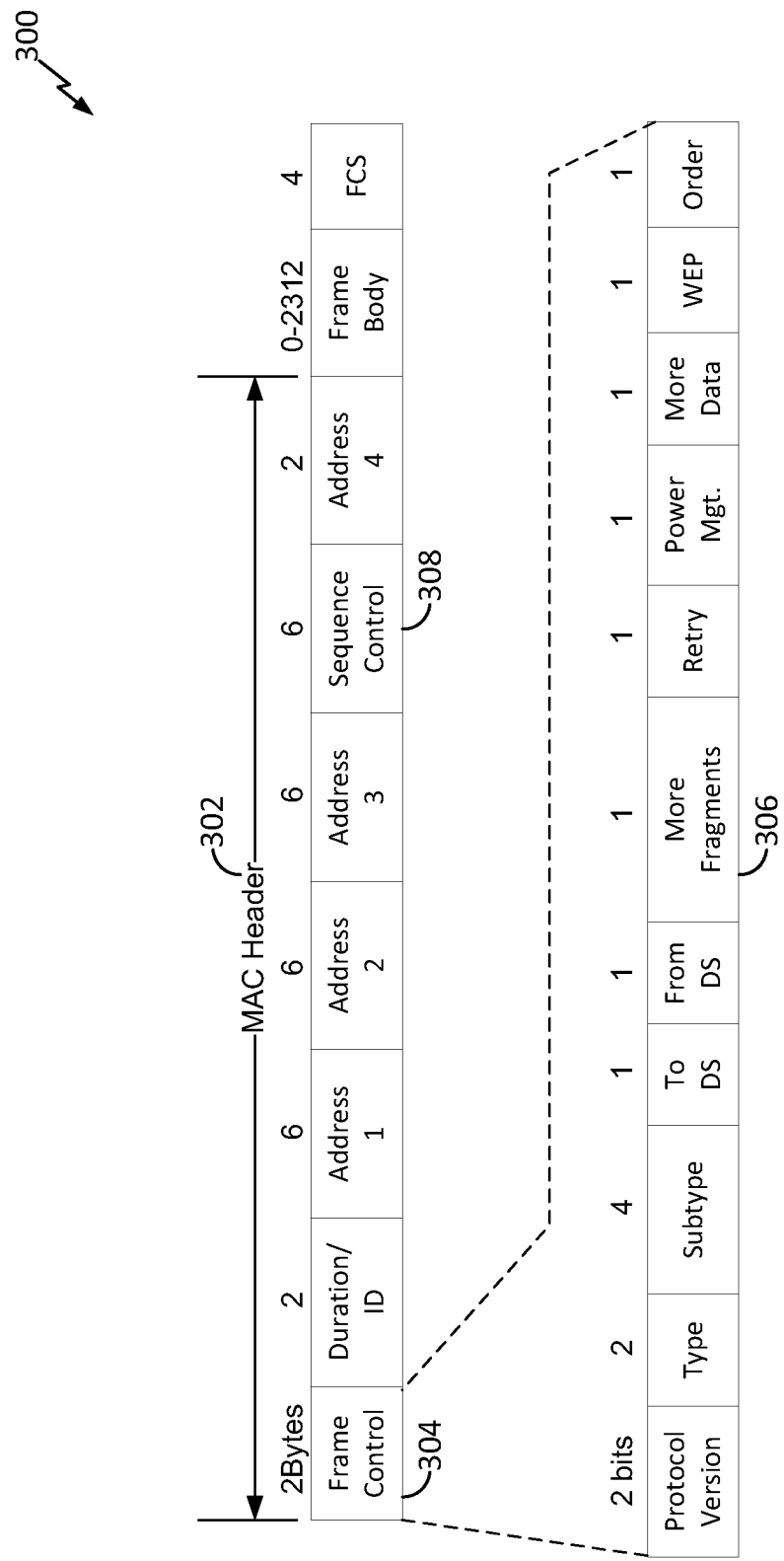
FIG. 3 is a conceptual diagram illustrating a media access control (MAC) frame structure.

In one aspect of the disclosure, with consideration of additional overhead due to fragmentation, the device 102 transmits WLAN data 116 and receives BT data 114, simultaneously. The WLAN data can be fragmented to avoid the BT data (e.g., high priority BT traffic). A WLAN frame can support fragmentation by dividing large messages into smaller fragments. FIG. 3 is a conceptual diagram illustrating a media access control (MAC) frame 300. In a MAC header 302, a Frame Control message 304 is placed at the beginning of the MAC header. In the Frame Control field, the "More Fragments" bit 306 indicates whether more fragments of the frame 300, either data or management type, are to follow. In the Sequence Control field 308 of the MAC header, the "Fragment Number" field indicates the number of each frame sent of a fragmented frame. Fragmentation creates MAC protocol data units (MPDUs) that are smaller than the original MAC service data unit (MSDU) length to increase reliability, at the cost of controlling overhead (e.g., increased ACK rounds, etc.). For example, in the IEEE 802.11 MAC, MSDU is fragmented into equal-size fragments and remains unchanged until all fragments in the burst are transmitted. Fragmentation with rate adaptation can be done dynamically and optimally based on the measured BT medium condition.

Figure 4:
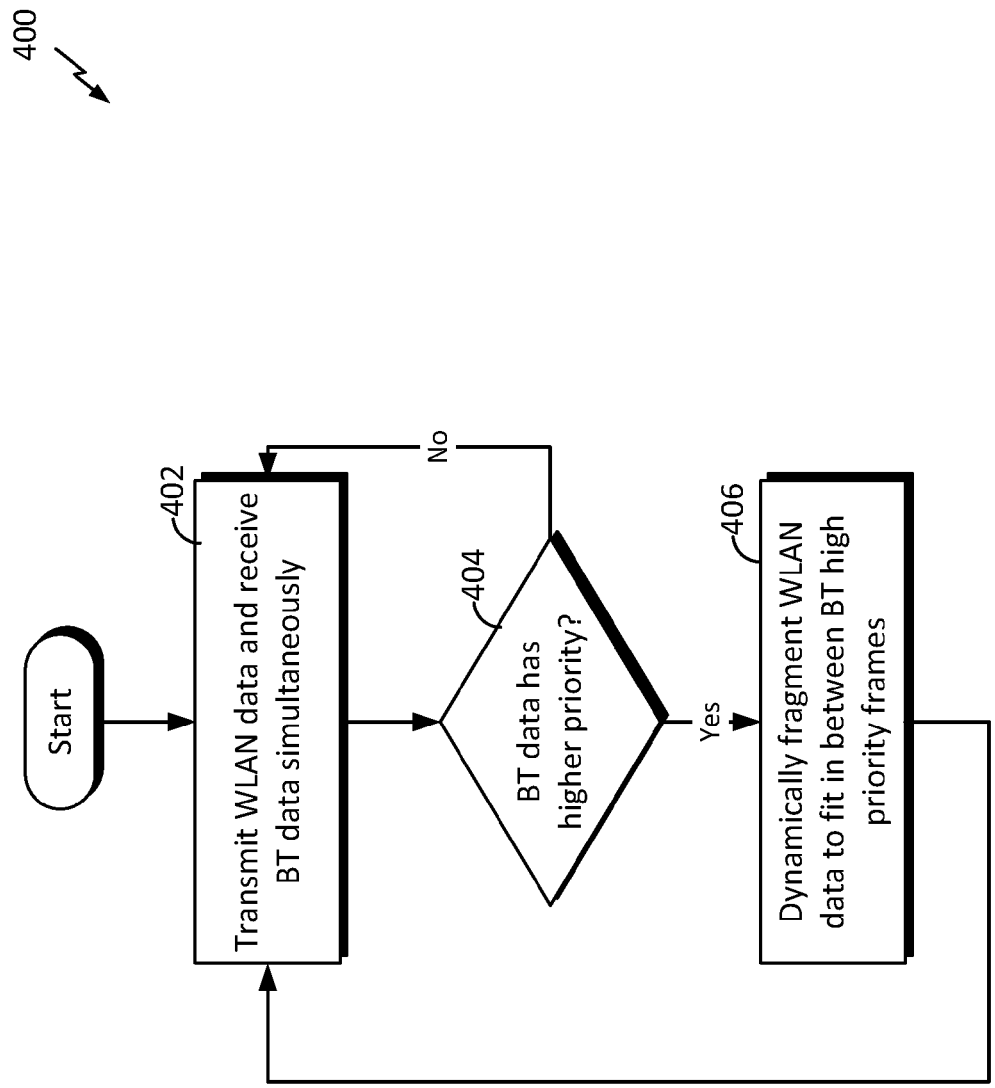
FIG. 4 is a flow chart illustrating a dynamic WLAN fragmentation process operable at a communication device in accordance with a first aspect of the disclosure.
Figure 5:
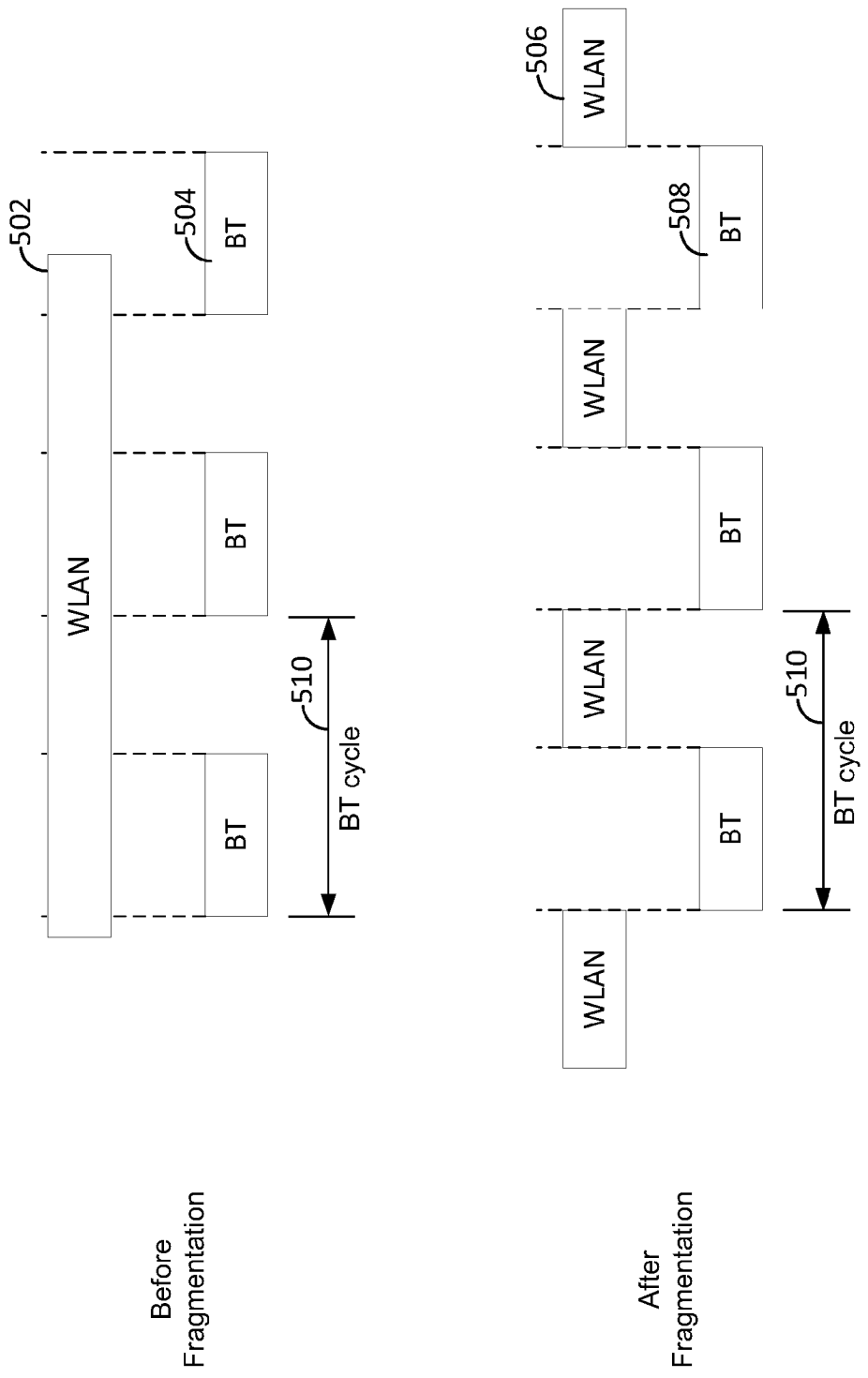
FIG. 5 is a conceptual diagram illustrating simultaneous WLAN and BT coexistence at a communication device in accordance with an aspect of the disclosure.

FIG. 4 is a flow chart illustrating a dynamic WLAN fragmentation process 400 operable at a communication device 102 in accordance with an aspect of the disclosure. In step 402, the device 102 is transmitting WLAN data (WLAN Tx) to the AP 110 and receiving BT data (BT Rx) from the device 112, simultaneously. Referring to FIG. 5, WLAN traffic 502 and BT traffic 504 occur simultaneously at the device 102. In step 404, if it is determined that BT Rx (e.g., ACL or eSCO) has higher priority than WLAN Tx, the process continues to step 406; otherwise, the process continues to step 402. In step 406, the communication device 102 is configured to fragment the WLAN Tx into a number of fragmented WLAN frames 506 and to transmit them in between the high priority BT frames 508 to reduce the probability of collision between BT and WLAN traffic. In an aspect of the disclosure, the WLAN Tx are fragmented into a number of smaller fragments based on the BT cycle 510 or a BT medium access timing of the device 102. The BT medium access timing refers to the time when the device 102 accesses the piconet that is different from media access control (MAC).

Figure 6:
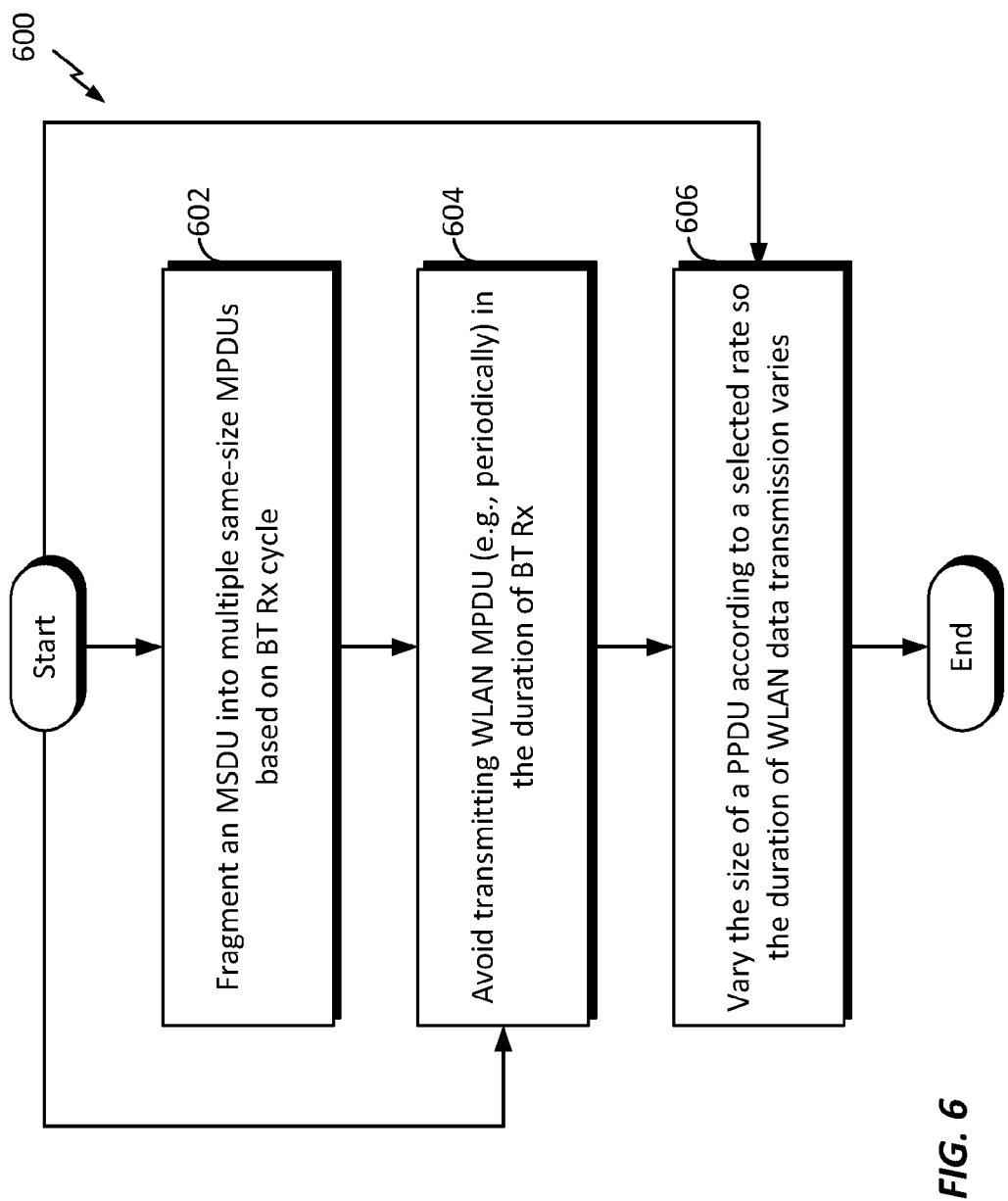
FIG. 6 is a conceptual diagram illustrating various dynamic fragmentation techniques in accordance with aspects of the disclosure.

FIG. 6 is a conceptual diagram illustrating some dynamic fragmentation techniques in accordance with aspects of the disclosure. For example, some or all of the dynamic fragmentation techniques of FIG. 6 may be performed in step 406 of FIG. 4. In a process 602, a communication device 102 may fragment an MSDU into multiple same-size MPDUs (except the last chunk) based on the BT Rx cycle so that the WLAN Tx traffic can avoid the periodic BT Rx traffic. In a process 604, the device 102 may avoid transmitting MPDU on WLAN in the duration of BT Rx, to reduce the collision probability of BT Rx with WLAN Tx. In a process 606, the device 102 may vary the size of a PLCP Protocol Data Unit (PPDU) of WLAN according to a selected rate so the duration of WLAN data transmission varies. Channel quality rate adaptation (associated with power adjustment) is also possible on PPDU, thus each PPDU can fit in an interval between BT Rx frames even in dynamic channel conditions. It should be appreciated that while the processes and events of FIGS. 4-6 are illustrated in an exemplary order, these processes and events may be performed in any suitable orders. In addition, these processes and events may be selectively performed or not performed.

Figure 7:
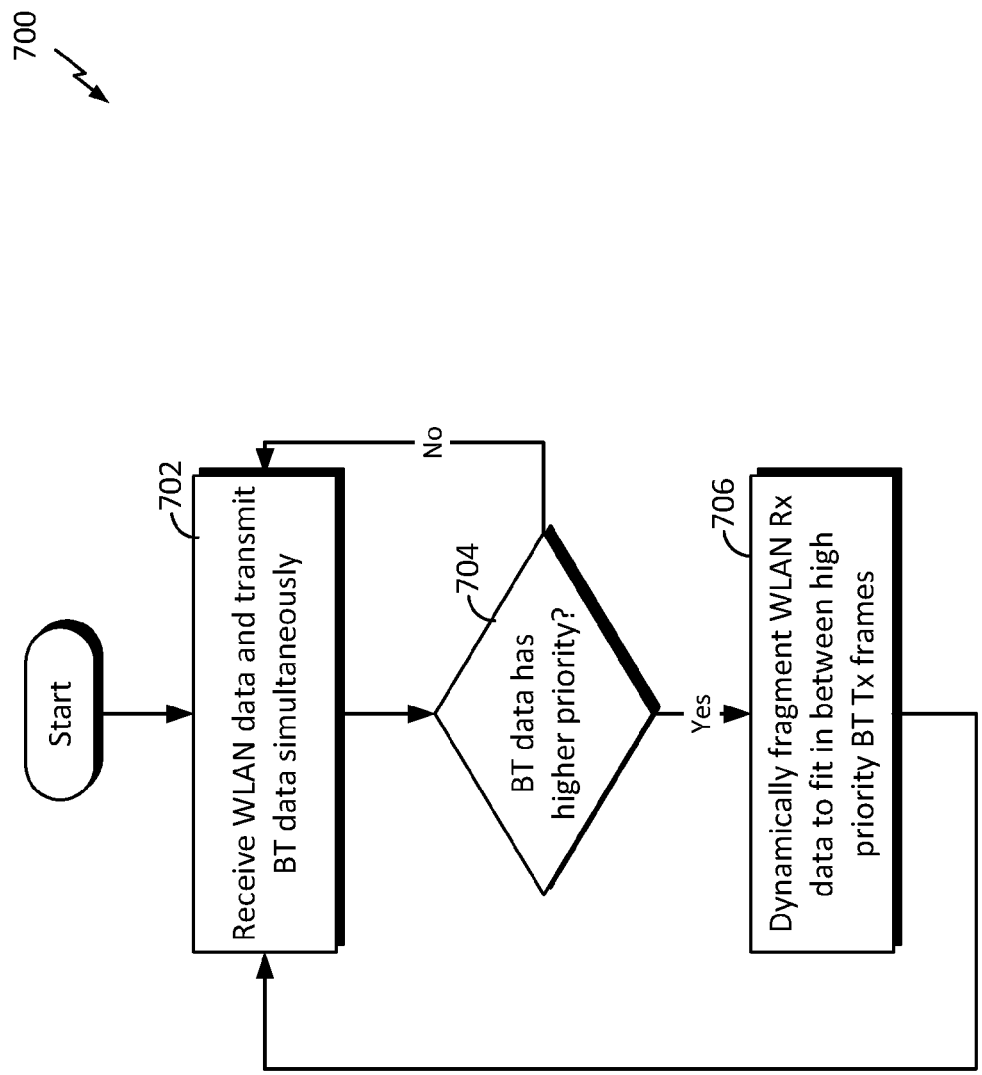
FIG. 7 is a flow chart illustrating a dynamic WLAN fragmentation method operable at a communication device in accordance with an aspect of the disclosure.

FIG. 7 is a flow chart illustrating a dynamic WLAN fragmentation method 700 operable at a communication device 102 in accordance with an aspect of the disclosure. In step 702, the device 102 is receiving WLAN data (WLAN Rx) from the AP 110 and transmitting BT data (BT Tx) to the device 112, simultaneously. In step 704, if it is determined that the BT Tx traffic (e.g., ACL or eSCO) has higher priority than WLAN Rx, the process continues to step 706; otherwise, the process continues to step 702. In step 706, the communication device 102 and the AP 110 are configured to fragment the WLAN data (e.g., WLAN 502) into a number of smaller frames (e.g., WLAN 506) that are received between BT periodic high priority frames (e.g., BT 508) to reduce the probability of collision between BT and WLAN traffic.

Figure 8:
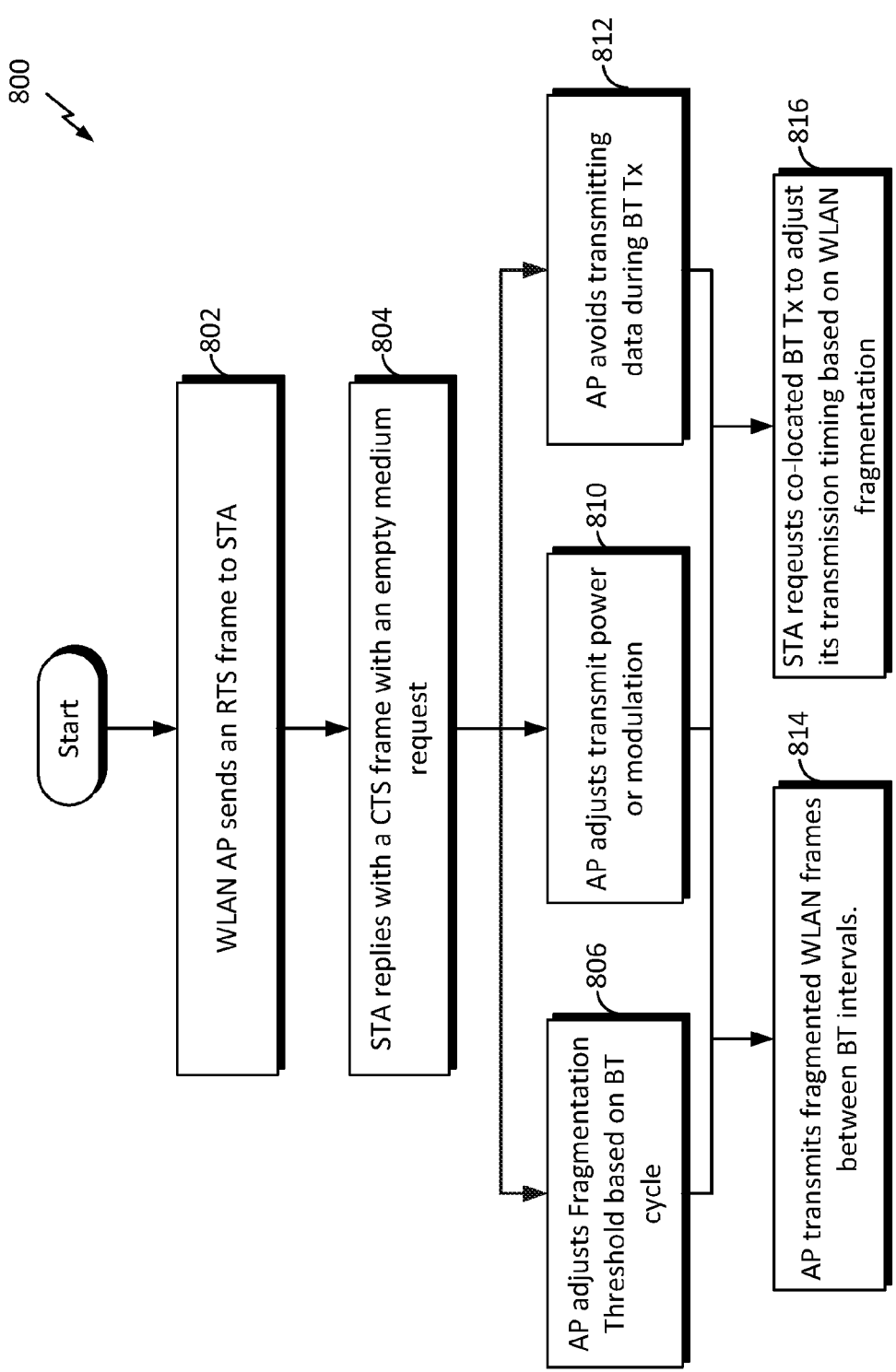
FIG. 8 is a flow chart illustrating a method of WLAN dynamic fragmentation with RTS/CTS (Request to send/Clear to send) in accordance with an aspect of the disclosure.

In various aspects of the disclosure, the communication device 102 receiving WLAN Rx is configured to communicate suitable information with the AP 110 such that the AP 110 and the device 102 can cooperate to fragment the WLAN data based on BT medium access timing or transmission interval to avoid collision between WLAN and BT traffic. In this case, suitable changes to the current WLAN protocols (e.g., IEEE 802.11 family) may be needed to implement the various aspects of the disclosure. FIG. 8 is a flow chart illustrating a method 800 of WLAN dynamic fragmentation with RTS/CTS (Request to send/Clear to send) in accordance with an aspect of the disclosure. In step 802, an AP 110 sends an RTS frame to a communication device 102. For example, referring to FIG. 9, in the 802.11 protocol, a node (e.g., AP 110) wishing to send data initiates the process by sending an RTS frame 902 to a station (STA) such as the device 102. In step 804, the STA replies with a CTS frame 904 including an empty medium request 906. Any other WLAN nodes receiving the RTS or CTS frame should refrain from sending data for a given time. For example, the CTS frame 904 may include the network allocation vector (NAV) setting for the available channel time before next BT Tx. The empty medium request 906 indicates a desired duration 908 of empty WLAN medium that corresponds to a BT transmission period 910 or cycle. The AP 110 is configured to avoid transmitting WLAN data to the STA during the period 910 in accordance with the empty medium request 906.

In step 806, the AP 110 can dynamically adjust a parameter called Fragmentation Threshold to apply frame fragmentation based on the BT cycle to avoid collision between WLAN and BT traffic. For example, the Fragmentation Threshold may have a value between 256 bytes to 2346 byes of MSDU size. Depending on the BT traffic (e.g., high priority eSCO, ACL), the Fragmentation Threshold can be lowered so that the AP may transmit WLAN MPDUs fragmented to fit in an interval 914 (i.e., empty BT medium) between BT traffic, in step 808. In step 810, the AP may adjust (e.g., boost) its transmit power and/or use higher modulation to finish transmitting the packets in a given time in order to avoid BT Tx. Further, in step 812, the AP may avoid transmitting (see duration 916 in FIG. 9) in the duration of BT Tx. In step 814, the AP transmits one or more fragmented WLAN frames 912 in the requested interval 914. In step 816, the STA may request co-located BT Tx to adjust its transmission timing based on the fragmentation timing.

Figure 9:
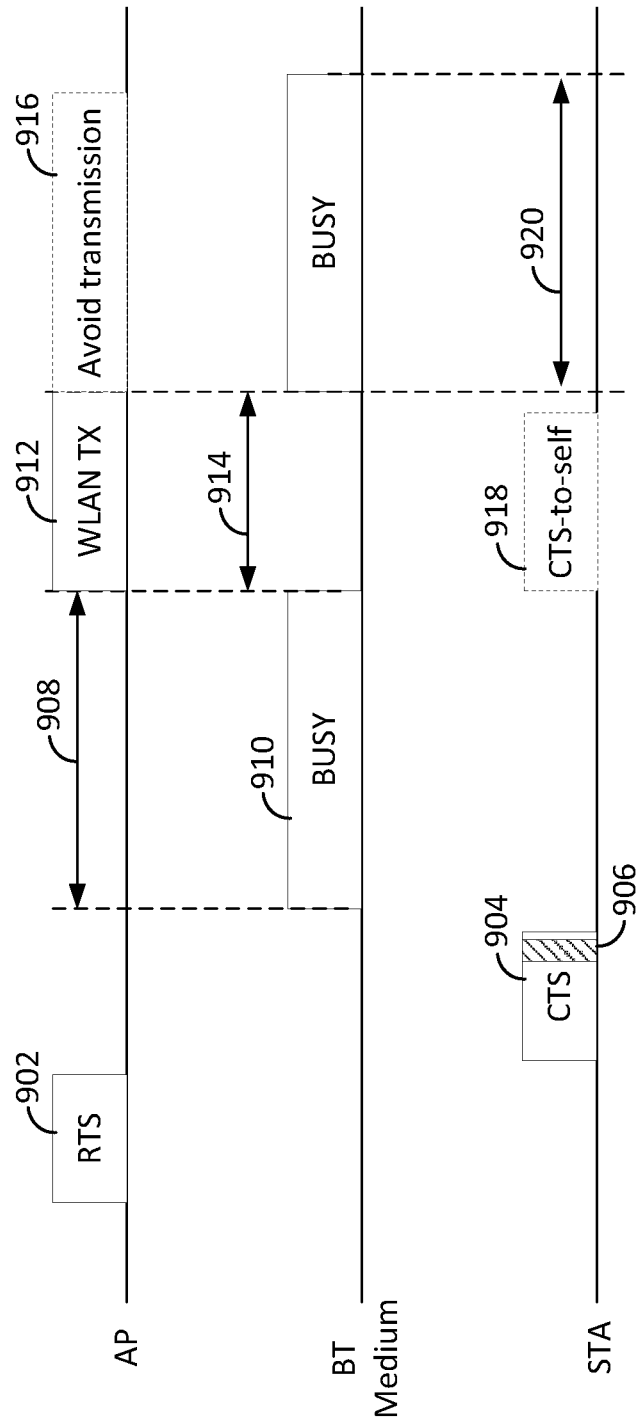
FIG. 9 is a conceptual diagram illustrating WLAN dynamic fragmentation with RTS/CTS in accordance with an aspect of the disclosure.

In an aspect of the disclosure, the STA may send a CTS-to-self frame 918 (see FIG. 9) to protect the BT Tx signal. Other WLAN nodes (e.g., AP or STAB) will avoid transmitting data for a duration 920 specified in the CTS-to-self frame so that any BT Tx signal sent in this duration 920 is protected. This approach does not require WLAN protocol change. It should be appreciated that while the processes and events of FIGS. 7-9 are illustrated in an exemplary order, these processes and events may be performed in any suitable orders. In addition, these processes and events may be selectively performed or not performed.

In another aspect of the disclosure, WLAN fragmentation may be implemented using WLAN's Traffic Indication Map (TIM) and Power Save Polling (PS-Poll) capabilities to perform dynamic fragmentation. In an 802.11 WLAN, an STA (e.g., device 102) can enter a power-save mode by sending a Null frame to an AP 110 with the Power Management bit set. From then on, the AP stores all packets destined to the STA in a per-STA queue and sets the TIM field in the beacon frame to indicate that packets destined for the STA have been queued at the AP. The TIM information element is sent by the AP to indicate to any STA if the AP has any buffered frames present for it. An STA wakes up from sleep every Listen Interval to receive the beacon frame, and when the STA detects that the TIM field for it has been set, it sends a PS-Poll frame to the AP. In response, the AP sends the first queued frame to the STA. The STA receives the queued data frame and if the More Data field in this frame is set, it sends another PS-Poll frame to the AP. The STA continues to send PS-Poll frames to receive all the queued frames and when none are left, it goes back to sleep until the next Listen Interval.

A delivery traffic indication message (DTIM) is a kind of TIM which informs the STAs about the presence of buffered multicast/broadcast data on the AP. DTIM is generated within the periodic beacon at a frequency specified by a DTIM Interval. The AP sends periodic beacons to synchronize the wireless network. While TIMs are used for signaling the presence of buffered unicast data, after a DTIM is sent, the AP will send the multicast/broadcast data on the WLAN medium following the normal channel access rules.

Figure 10:
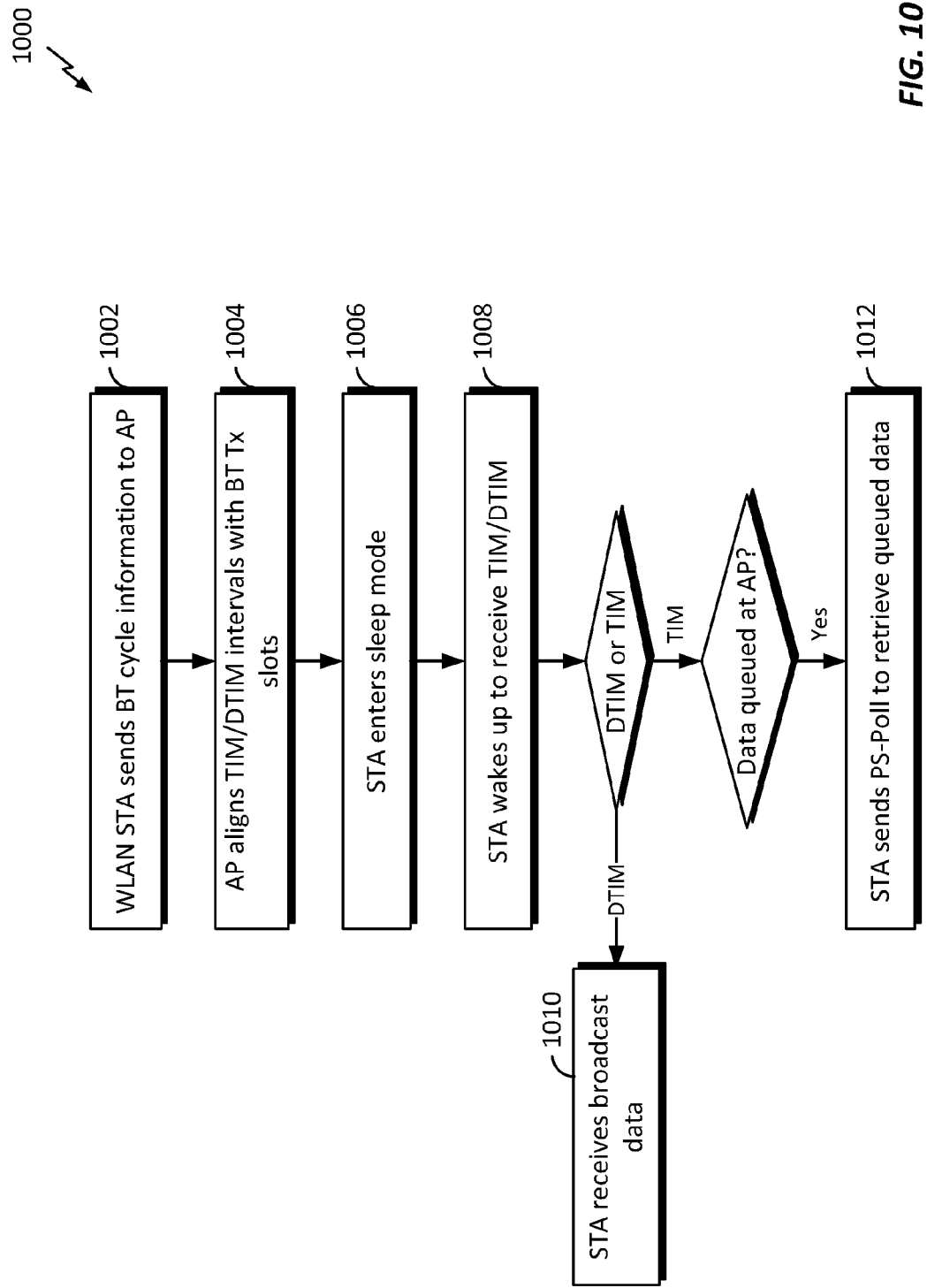
FIG. 10 is a flow chart illustrating a method of WLAN dynamic fragmentation utilizing a TIM/PS-Poll scheme in accordance with an aspect of the disclosure.
Figure 11:
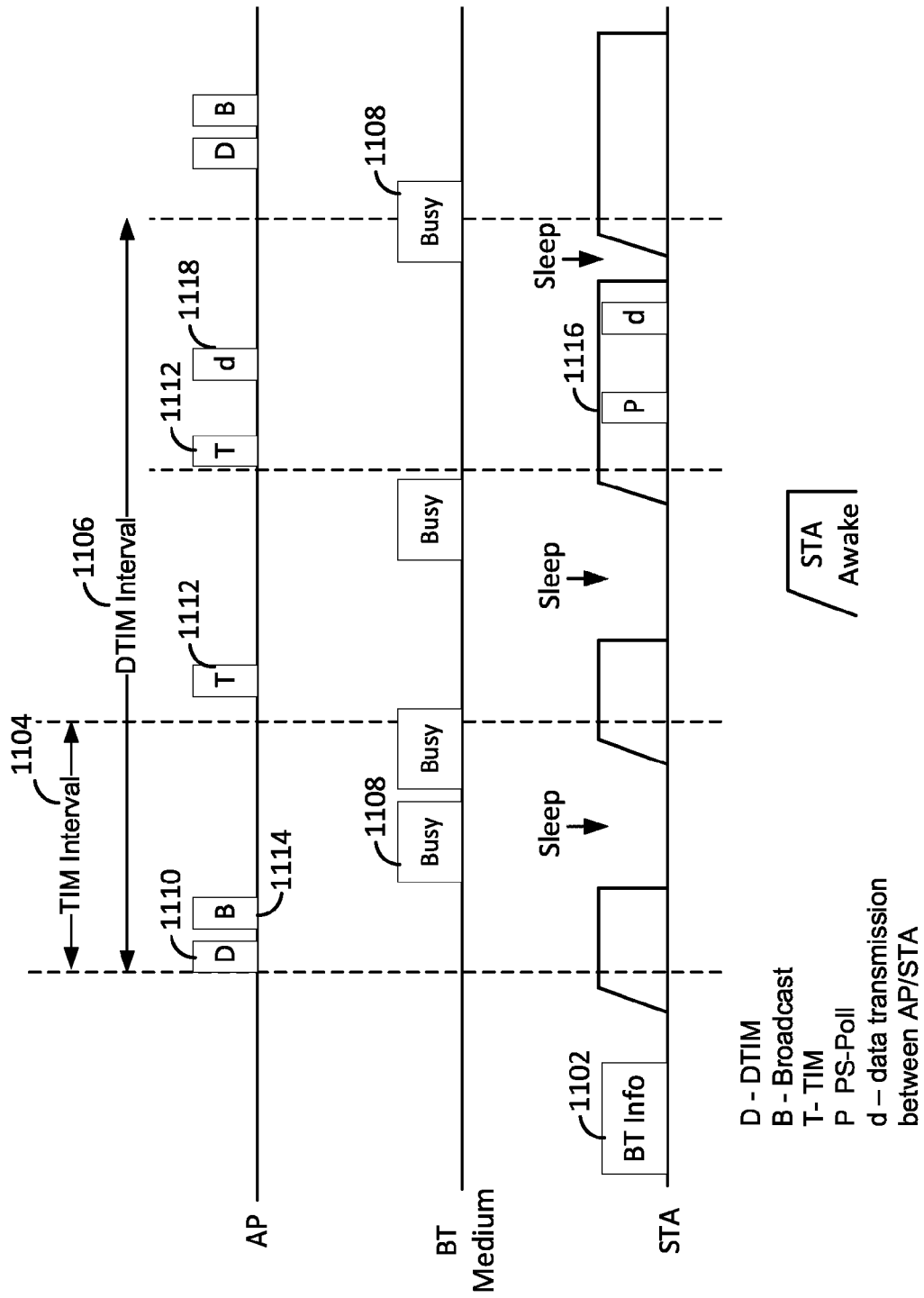
FIG. 11 is a conceptual diagram illustrating WLAN dynamic fragmentation with TIM/PS-Poll in accordance with an aspect of the disclosure.

In an aspect of the disclosure, a communication device 102 is configured to listen to the Tx/Rx traffic from BT/WLAN, respectively, and then coordinates their traffic. FIG. 10 is a flow chart illustrating a method 1000 of WLAN dynamic fragmentation utilizing a TIM/PS-Poll scheme in accordance with an aspect of the disclosure. The method 1000 may be performed in the step 706 of FIG. 7. In step 1002, a communication device 102 (STA) exchanges BT timing or cycle information (BT info) 1102 (see FIG. 11) with an AP 110. The STA may include BT timing or cycle information in a PS-Poll message for the AP. For example, the BT info may include slots timing and cycle time of high priority BT Tx (e.g., eSCO and ACL). In step 1004, the AP is configured to align its TIM interval timing 1104 and DTIM interval timing 1106 with BT Tx traffic 1108 based on the BT info 1102 (see FIG. 11). As illustrated in FIG. 11, the DTIM and TIM transmission and the BT Tx traffic 1108 do not overlap with each other.

In step 1006, the STA may enter a sleep mode to reduce its power consumption. The STA may disable or power off all or some components corresponding to WLAN (e.g., WLAN transceiver and RF front end) during the sleep mode. In step 1008, the STA wakes up at a time corresponding to the DTIM/TIM intervals to receive the DTIM 1110 or TIM 1112. In step 1010, if a DTIM is received, the STA may receive the broadcast data 1114 from the AP. In step 1012, if the received TIM indicates data queued at the AP destined to the STA, the STA may send a PS-Poll 1116 to the AP to retrieve the queued data 1118. As illustrated in FIGS. 10 and 11, using WLAN PS-Poll/TIM/DTIM and BT info, the AP and STA can fragment WLAN Rx in alignment with the BT Tx timing to avoid collision between WLAN Rx and BT Tx traffic. It should be appreciated that while the processes and events of FIGS. 10-11 are illustrated in an exemplary order, these processes and events may be performed in any suitable orders. In addition, these processes and events may be selectively performed or not performed.

Figure 12:
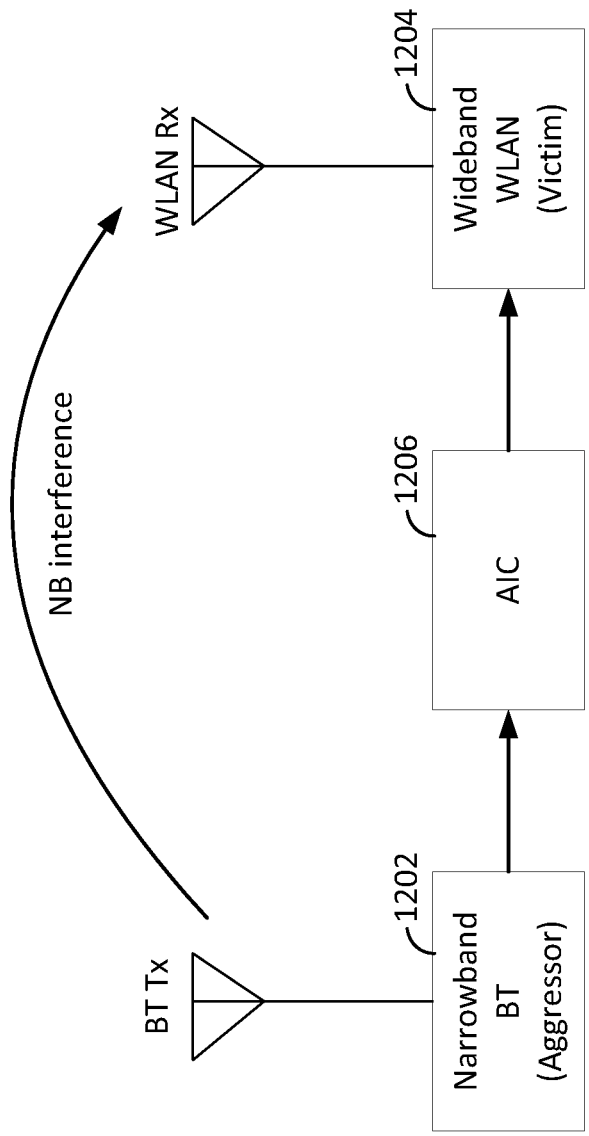
FIG. 12 is a conceptual diagram illustrating a narrowband active interference cancellation (AIC) technique for improving BT and WLAN coexistence at a communication device in accordance with an aspect of the disclosure.

FIG. 12 is a conceptual diagram illustrating a narrowband active interference cancellation (AIC) technique for improving BT and WLAN coexistence at a communication device in accordance with an aspect of the disclosure. Active interference cancellation can be done by tapping off the transmitted signal at a transmitter and then add to the receiver after adjustment of the gain and phase. As the interference from the co-located transmitter is much higher than the desired signal sent from a remote device, without properly coordinating the interference, the reception of WLAN data may not be possible. AIC can be enabled to cancel the interference from the co-located transmitter at the receiver. The device may be a communication device 102 including a BT transceiver 1202 and a WLAN transceiver 1204. When the BT transceiver 1202 is transmitting data (BT Tx) while the WLAN transceiver 1204 is receiving data (WLAN Rx), the BT Tx can cause a narrowband interference on the WLAN Rx. In this case, the communication device may apply AIC 1206 to mitigate narrowband interface.

Figure 13:
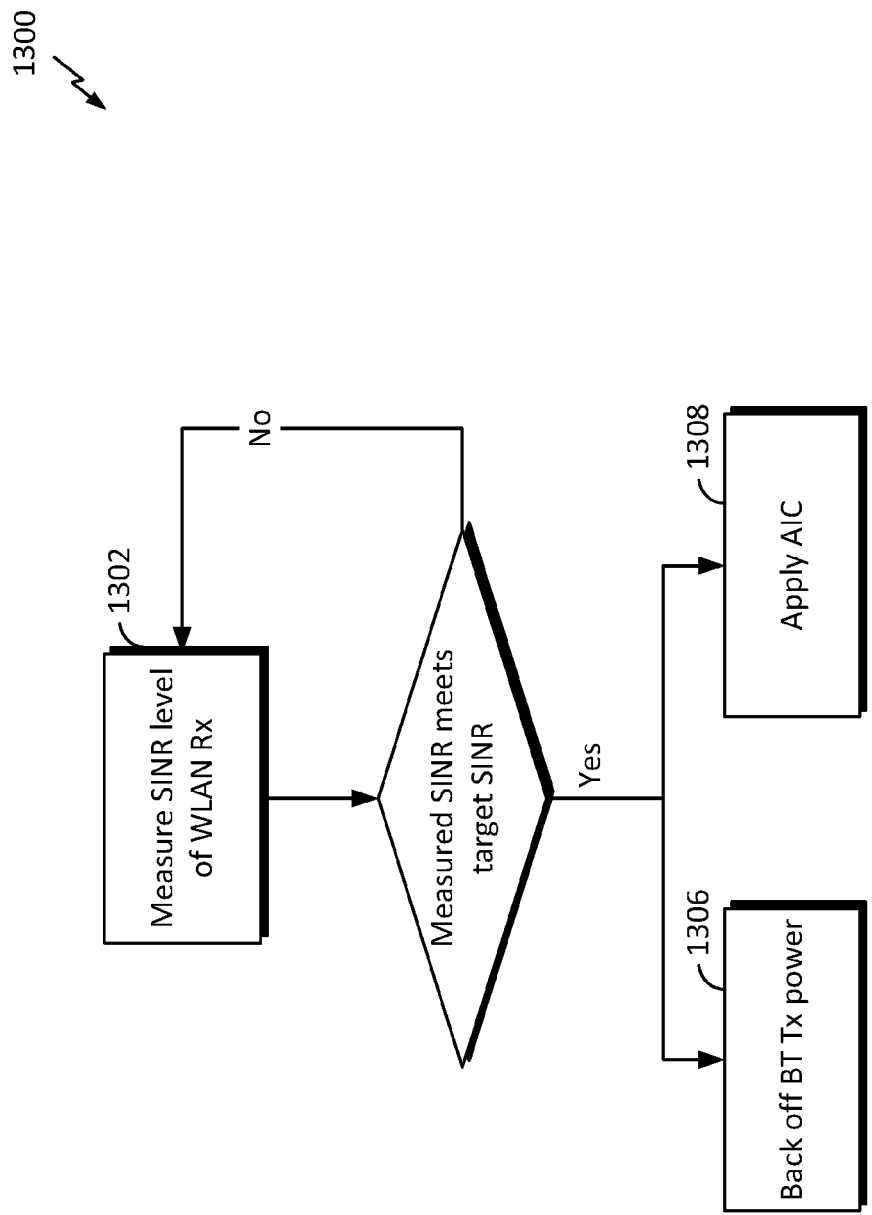
FIG. 13 is a flow chart illustrating a method of mitigating narrowband self-interference in accordance with an aspect of the present disclosure.

FIG. 13 is a flow chart illustrating a method 1300 of mitigating narrowband self-interference in accordance with an aspect of the present disclosure. The method 1300 may be performed at a communication device 102 including the BT transceiver 1202 and the WLAN transceiver 1204 of FIG. 12. In various aspects of the disclosure, the method 1300 may be performed in addition to or independent from the WLAN fragmentation techniques described in reference to FIGS. 1-11. In this example, it is assumed that the BT transceiver 1202 is transmitting data (BT Tx), and the WLAN transceiver 1204 is receiving data (WLAN Rx). In step 1302, the device 102 is configured to measure, a signal to interference ratio such as the signal to interference plus noise ratio (SINR) level of WLAN Rx. The SINR is commonly used in wireless communication as a way to measure the quality of wireless connections. The value of SINR can be calculated as follow:

$$SINR=P/(I+N) \text{ where } P \text{ is signal power, } I \text{ is interference power, and } N \text{ is noise power.}$$

If the measured SINR does not meet a desired target SINR, the device 102 may back off BT Tx power in step 1306 or apply AIC in step 1308. The target SINR is generally below 0 dB where the interference level is at least not greater than the desired signal.

Figure 14:
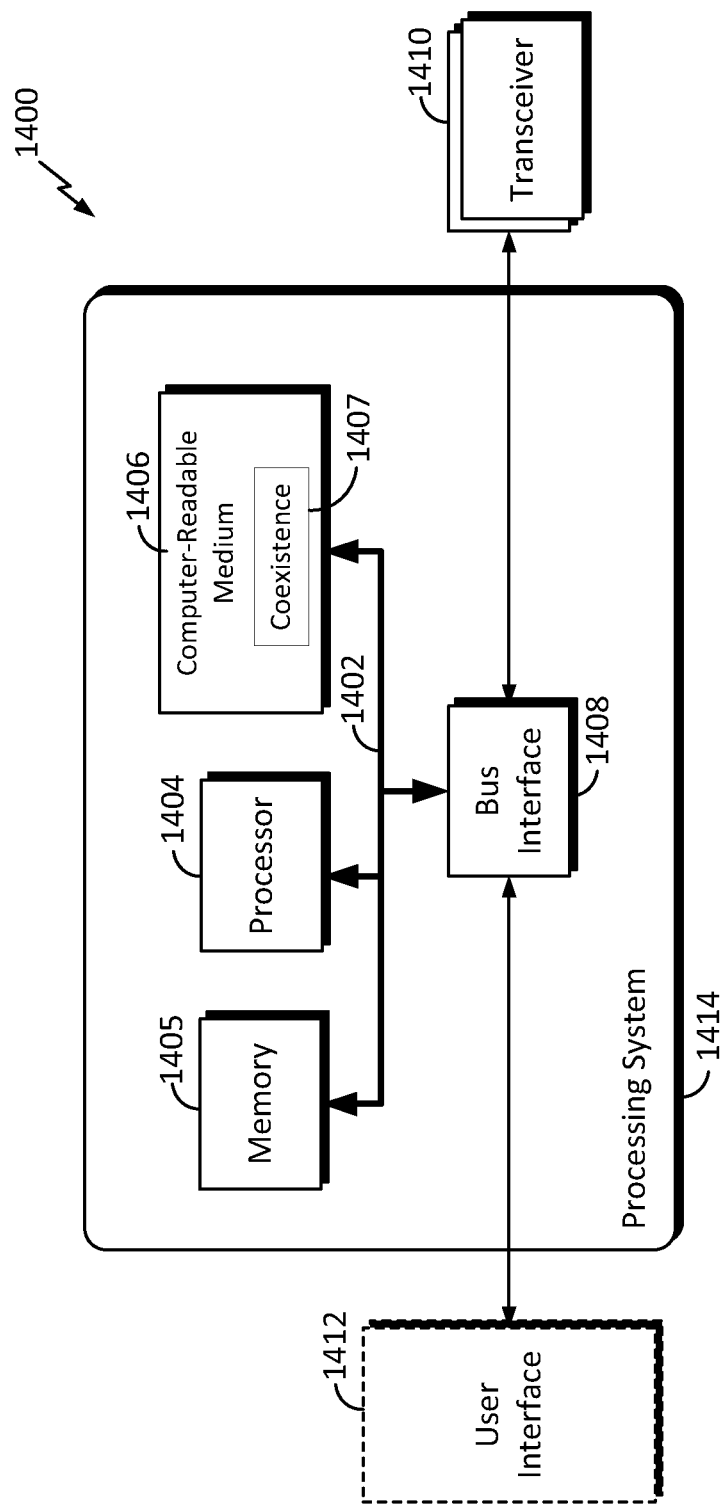
FIG. 14 is a conceptual diagram illustrating an example of a hardware implementation for an apparatus employing a processing system in accordance with an aspect of the disclosure.

FIG. 14 is a conceptual diagram illustrating an example of a hardware implementation for an apparatus 1400 employing a processing system 1414. In accordance with various aspects of the disclosure, an element, or any portion of an element, or any combination of elements may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure in FIGS. 1-13. For example, the apparatus 1400 may be used to implement the communication devices 102 and 112, and the access point 110.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 links together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a means for communicating with various other apparatus over a transmission medium. In various aspects of the disclosure, the apparatus 1400 may include one or more transceivers 1410 configured to communicate over different transmission media. For example, the transceivers 1410 may be configured to communicate over a WLAN or a piconet (e.g., Bluetooth) wireless medium. Depending upon the nature of the apparatus, a user interface 1412 (e.g., keypad, display, speaker, microphone, joystick, touchscreen, touchpad) may also be provided.

The processor 1404 is responsible for managing the bus 1402 and general processing, including the execution of software stored on the computer-readable medium 1406. The software, when executed by the processor 1404, causes the processing system 1414 to perform the various functions described infra for any particular apparatus. In an aspect of the disclosure, the software includes coexistence software 1407, when executed by the processor 1404, causes the processing system 1414 to perform the various BT/WLAN coexistence techniques described in reference to FIGS. 1-13. The computer-readable medium 1406 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure in reference to FIGS. 1-13 depending on the particular application and the overall design constraints imposed on the overall system.

Figure 15:
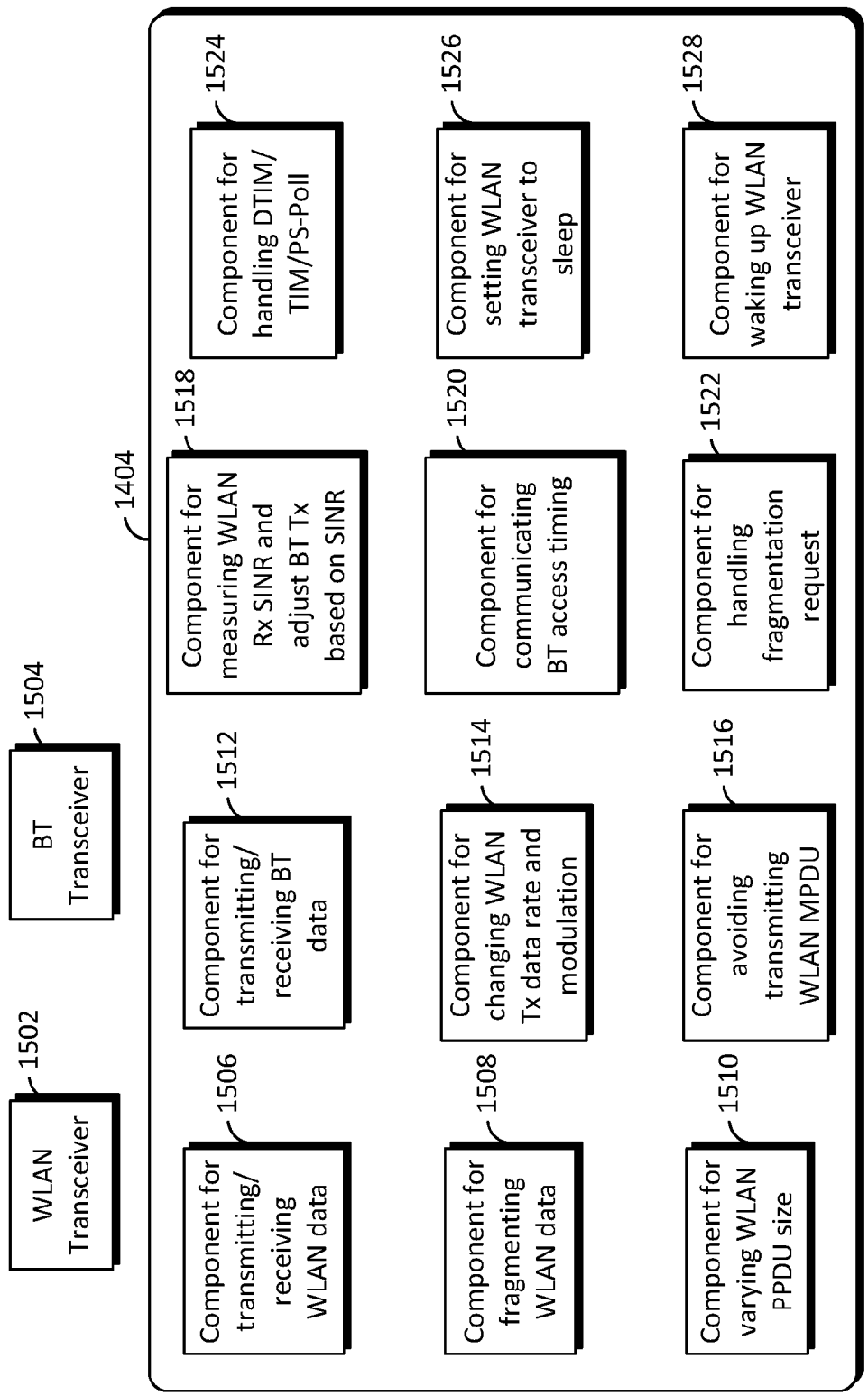
FIG. 15 is a conceptual block diagram illustrating the apparatus of FIG. 14 configured as a communication device for BT and WLAN coexistence operations in accordance with an aspect of the disclosure.

FIG. 15 is a conceptual block diagram illustrating the apparatus 1400 configured as a communication device for BT and WLAN coexistence operations in accordance with an aspect of the disclosure. For example, this apparatus 1400 may be a communication device 102. The apparatus 1400 includes a WLAN transceiver 1502 and a BT transceiver 1504. The WLAN transceiver 1502 and BT transceiver 1504 may be the transceivers 1410. The WLAN transceiver 1502 may be used to access a WLAN medium according to a WLAN protocol, e.g., 802.11 protocol. The BT transceiver 1504 may be used to access a BT medium according to a piconet protocol. The processor 1404 includes a component 1506 for transmitting/receiving WLAN data, a component 1508 for fragmenting WLAN data, a component 1510 for varying WLAN PPDU size, a component 1512 for transmitting/receiving BT data, a component 1514 for changing WLAN Tx data rate and modulation, a component 1516 for avoiding transmitting a WLAN MPDU, a component 1518 for measuring WLAN Rx SINR and adjusting BT Tx based on SINR, a component 1520 for communicating BT Tx medium access timing, a component 1522 for handling fragmentation request, a component 1524 for handling DTIM/TIM/PS-Poll frames, a component 1526 for setting the WLAN transceiver 1502 to a sleep mode, and a component 1528 for waking up the WLAN transceiver 1502. Other generally known components of the apparatus 1400 not necessary for describing the novel features of this example are not shown in FIG. 15 for clarity.

In an aspect of the disclosure, the various components of FIG. 15 may be configured to implement a communication device 102 as follows. The component 1512 may be configured to utilize the BT transceiver 1504 to receive BT data (BT Rx). The component 1508 may be configured to dynamically fragment one or more data frames of WLAN data into a plurality of fragmented frames based on a medium access timing of the BT Rx (e.g., BT cycle 510 of FIG. 5). The component 1506 may be configured to utilize the WLAN transceiver 1502 to transmit the fragmented WLAN data (WLAN Tx), while avoiding collision between BT Rx and WLAN Tx. The component 1516 may be configured to control the WLAN transceiver 1502 to avoid transmitting an MPDU while receiving BT Rx. The component 1510 may be configured to dynamically vary the size of a PPDU of the fragmented WLAN frames based on a channel condition for transmitting WLAN Tx. The component 1514 may be configured to dynamically change a data rate or modulation of the fragmented WLAN frames based on a channel condition for transmitting WLAN Tx.

In an aspect of the disclosure, the various components of FIG. 15 may be configured to implement a communication device 102 as follows. The component 1512 may be configured to utilize the BT transceiver 1504 to transmit BT data (BT Tx). The component 1522 may be configured to utilize the WLAN transceiver 1502 to send a fragmentation request to an access point 110 to dynamically fragment one or more data frames of WLAN data into a plurality of fragmented frames (WLAN Rx) based on a medium access timing of BT Tx. The component 1506 may be configured to utilize the WLAN transceiver 1502 to receive the fragmented WLAN data, while avoiding collision between the BT Tx and WLAN Rx. The fragmentation request may be configured to trigger the access point to adjust a fragmentation threshold. The fragmentation request may be configured to request the access point to avoid transmitting the fragmented WLAN Rx during the transmission of BT Tx. The fragmentation request may be configured to request the access point to avoid transmitting an MPDU during the transmission of BT Tx.

The component 1522 may be configured to send a CTS frame including the fragmentation request in response to an RTS frame received from the access point. The component 1512 may be configured to adjust the transmission of the BT data based on the fragmentation of the WLAN data. The component 1518 may be configured to measure an SINR of the received WLAN Rx, and adjust the transmission of the BT Tx based on the measured SINR of the received WLAN Rx. The component 1518 may be further configured to reduce a transmission power of BT Tx; apply digital pre-distortion to BT Tx; or perform active interference cancellation to mitigate an interference imposed on WLAN Rx by BT Tx.

In an aspect of the disclosure, the various components of FIG. 15 may be configured to implement a communication device 102 as follows. The component 1512 may be configured to utilize the BT transceiver 1504 to transmit BT data (BT Tx). The component 1520 may be configured to utilize the WLAN transceiver 1502 to communicate a medium access timing of BT Tx to an access point 110. The component 1526 may be configured to set the WLAN transceiver 1502 to a sleep mode. The component 1528 may be configured to wake up the WLAN transceiver 1502 to receive WLAN Rx from the access point when the BT transceiver 1504 is not transmitting data based on the medium access timing, wherein the received WLAN Rx was queued at the access point when the WLAN transceiver 1502 was in the sleep mode. The component 1524 may be configured to receive a TIM from the access point, wherein the TIM indicates that at least one packet of WLAN Rx is queued at the access point. The component 1524 may be configured to transmit a PS-Poll to the access point in response to receiving the TIM, utilizing the WLAN transceiver 1502. The component 1524 may be configured to receive a DTIM from the access point, wherein the DTIM indicates the WLAN Rx is broadcast data. The component 1518 may be configured to measure an SINR of the received WLAN Rx, and adjust the transmission of BT Tx based on the measured SINR of the received WLAN Rx. The component 1518 may be further configured to reduce a transmission power of BT Tx, apply digital pre-distortion to BT Tx, or perform active interference cancellation to mitigate an interference imposed on WLAN Rx by BT Tx.

Figure 16:
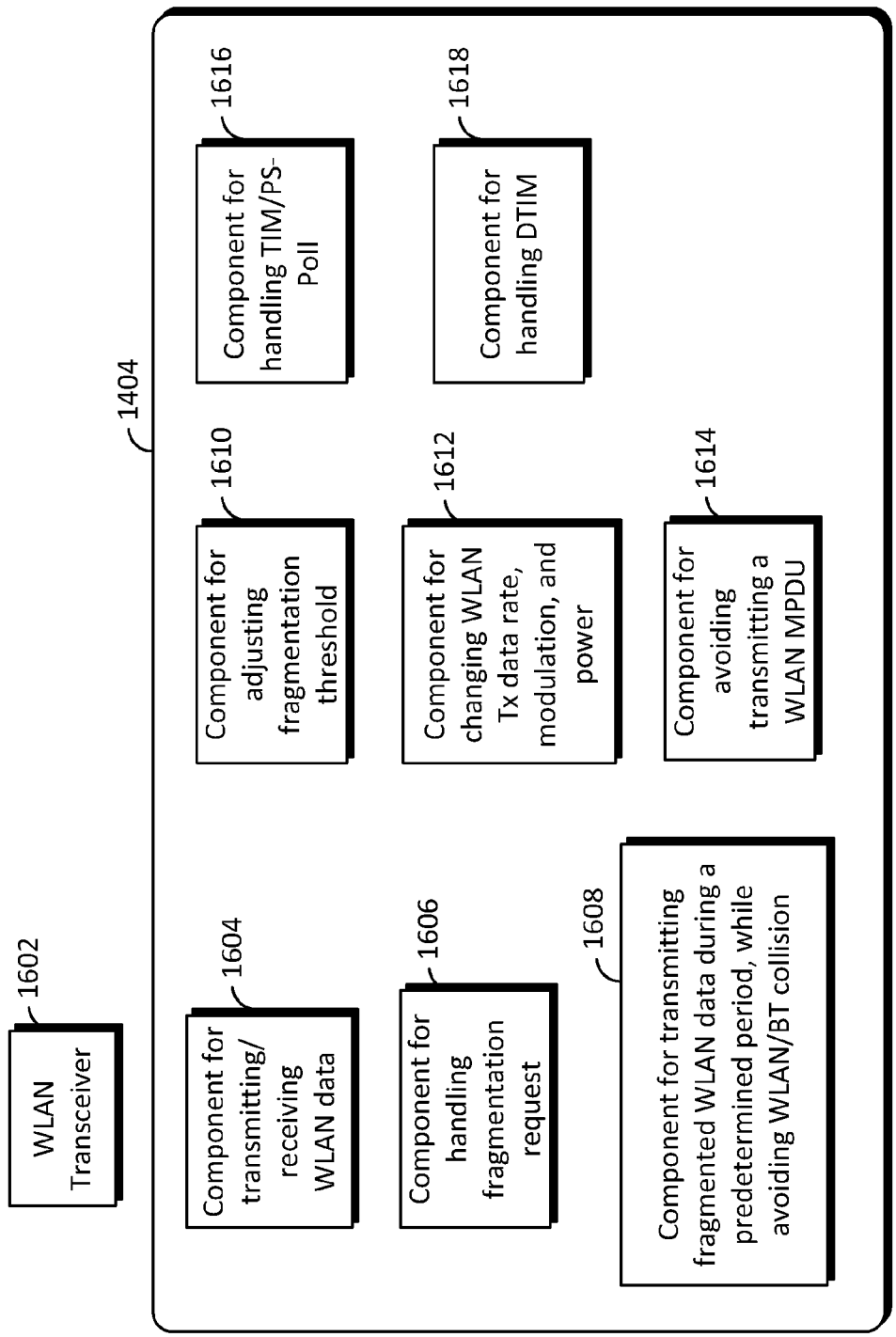
FIG. 16 is a conceptual block diagram illustrating the apparatus of FIG. 14 configured as a WLAN access point in accordance with an aspect of the disclosure.

FIG. 16 is a conceptual block diagram illustrating the apparatus 1400 configured as a WLAN access point in accordance with an aspect of the disclosure. For example, this apparatus 1400 may be an access point 110. The apparatus 1400 includes a WLAN transceiver 1602. The WLAN transceiver 1602 may be the transceiver 1410 (see FIG. 14). The WLAN transceiver 1602 may be used to access a WLAN medium according to a WLAN protocol, e.g., 802.11 protocol. The processor 1404 includes a component 1604 for transmitting and receiving WLAN data, a component 1606 for handling fragmentation request, a component 1608 for transmitting fragmented WLAN data during a predetermined period, while avoiding WLAN and BT collision, a component 1610 for adjusting a fragmentation threshold, a component 1612 for changing WLAN data rate, modulation, and power, a component 1614 for avoiding transmitting a WLAN MPDU, a component 1616 for handling TIM/PS-Poll, and a component 1618 for handling DTIM. Other generally known components of the apparatus 1400 not necessary for describing the novel features of this example are not shown in FIG. 16 for clarity.

In an aspect of the disclosure, the various components of FIG. 16 may be configured to implement an access point 110 as described in reference to FIGS. 1-14. The component 1604 may be configured to utilize the WLAN transceiver 1602 to transmit WLAN data to a communication device 102, utilizing a WLAN medium. The component 1606 may be configured to receive a fragmentation request from the communication device to dynamically fragment one or more data frames of the WLAN data into a plurality of fragmented frames. The component 1608 may be configured to transmit the fragmented WLAN data during a predetermined period (e.g., period 914 in FIG. 9) indicated by the fragmentation request, while avoiding collision between the WLAN data and BT data transmitted by the communication device utilizing a BT wireless medium (e.g., BT medium in FIG. 9). The component 1610 may be configured to adjust a fragmentation threshold of the access point based on the fragmentation request. The component 1612 may be configured to boost a transmit power of the WLAN data in response to the fragmentation request. The component 1612 may be configured to change a modulation of the fragmented WLAN data. The component 1614 may be configured to avoid transmitting an MPDU on the WLAN during a predetermined period indicated by the fragmentation request. The component 1606 may be further configured to receive a CTS frame including the fragmentation request in response to a previously sent RTS frame. The component 1618 may be configured to transmit a DTIM indicating the availability of WLAN broadcast data during the predetermined period. The component 1616 may be configured to transmit a TIM indicating the availability of WLAN data destined to the communication device queued at the access point, receive a PS-Poll from the communication device, and transmit the fragmented WLAN data to the communication device during the predetermined period in response to the PS-Poll.

Figure 17:
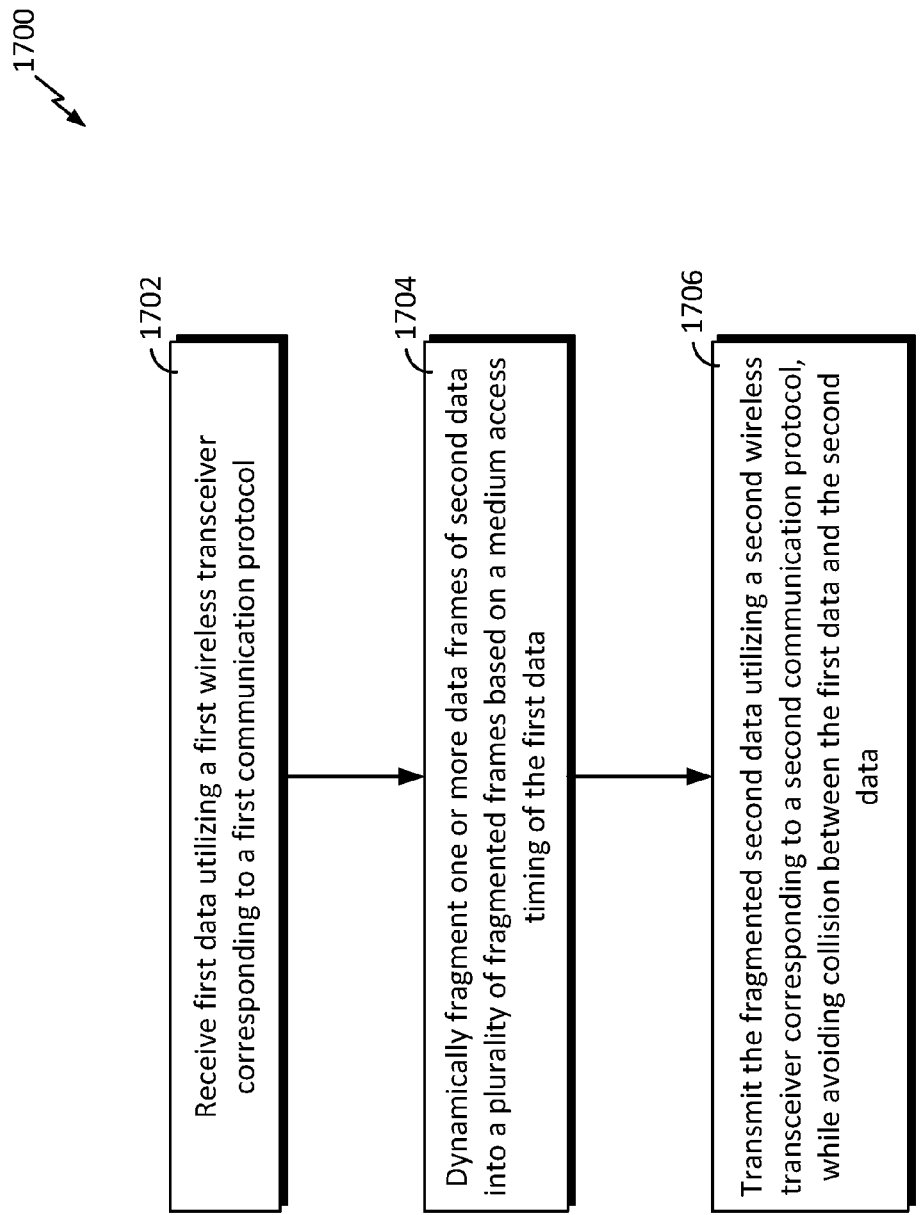
FIG. 17 is a flow chart illustrating a method of wireless communication operable at a communication device in accordance with an aspect of the disclosure.

FIG. 17 is a flow chart illustrating a method 1700 of wireless communication operable at a communication device 102 in accordance with an aspect of the disclosure. In step 1702, the communication device 102 receives first data (e.g., BT data) utilizing a first wireless transceiver (e.g., BT transceiver) corresponding to a first communication protocol (e.g., piconet protocol). In step 1704, the device 102 dynamically fragments one or more data frames of second data (e.g., WLAN data) into a plurality of fragmented frames based on a medium access timing of the first data. In step 1706, the device 102 transmits the fragmented second data utilizing a second wireless transceiver (e.g., WLAN transceiver) corresponding to a second communication protocol (e.g., 802.11 protocol), while avoiding collision between the first data and the second data.

Figure 18:
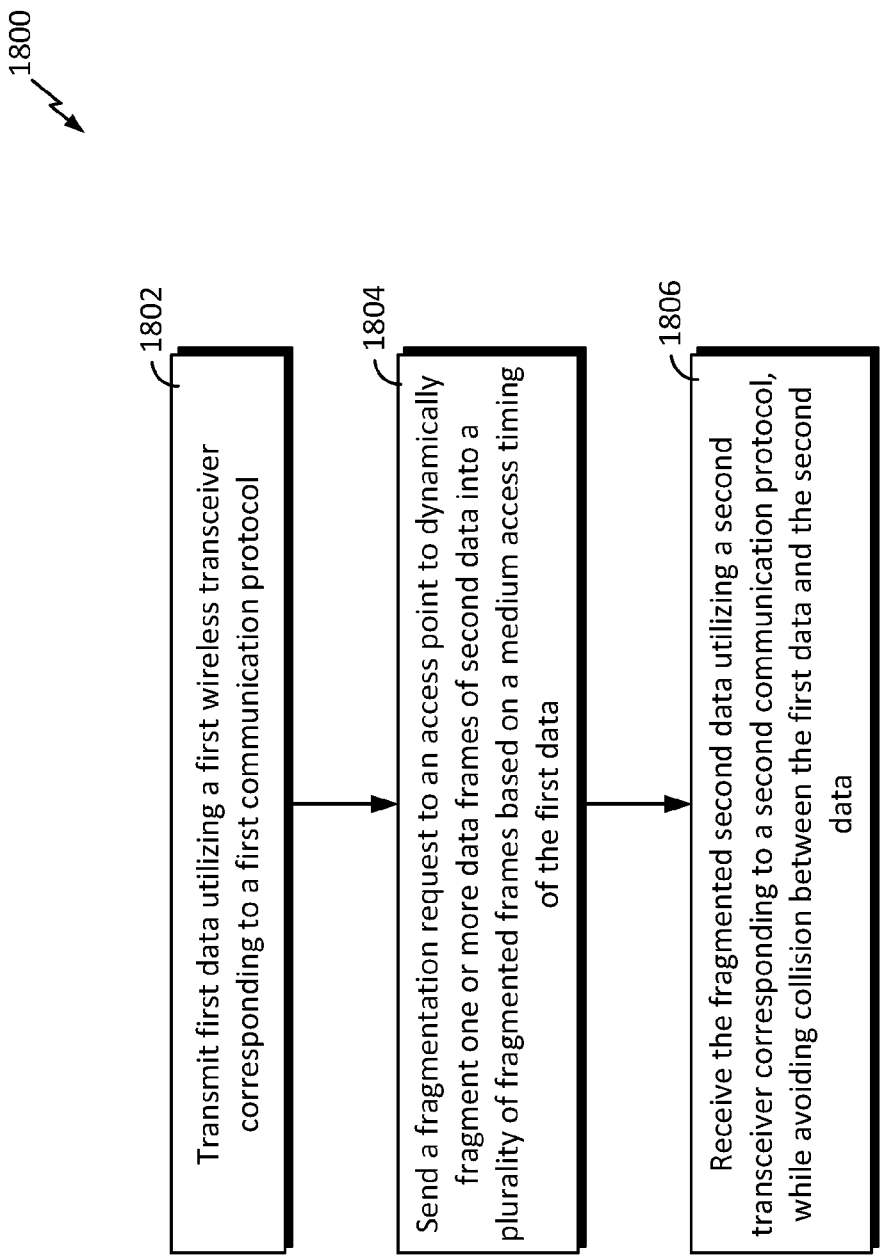
FIG. 18 is a flow chart illustrating a method of wireless communication operable at a communication device in accordance with an aspect of the disclosure.

FIG. 18 is a flow chart illustrating a method 1800 of wireless communication operable at a communication device 102 in accordance with an aspect of the disclosure. In step 1802, the device 102 transmits first data (e.g., BT data) utilizing a first wireless transceiver (e.g., BT transceiver) corresponding to a first communication protocol (e.g., piconet protocol). In step 1804, the device 102 sends a fragmentation request to an access point (e.g., AP 110) to dynamically fragment one or more data frames of second data (WLAN data) into a plurality of fragmented frames based on a medium access timing of the first data. In step 1806, the device 102 receives the fragmented second data utilizing a second transceiver (e.g., WLAN transceiver) corresponding to a second communication protocol (e.g., 802.11 protocol), while avoiding collision between the first data and the second data.

Figure 19:
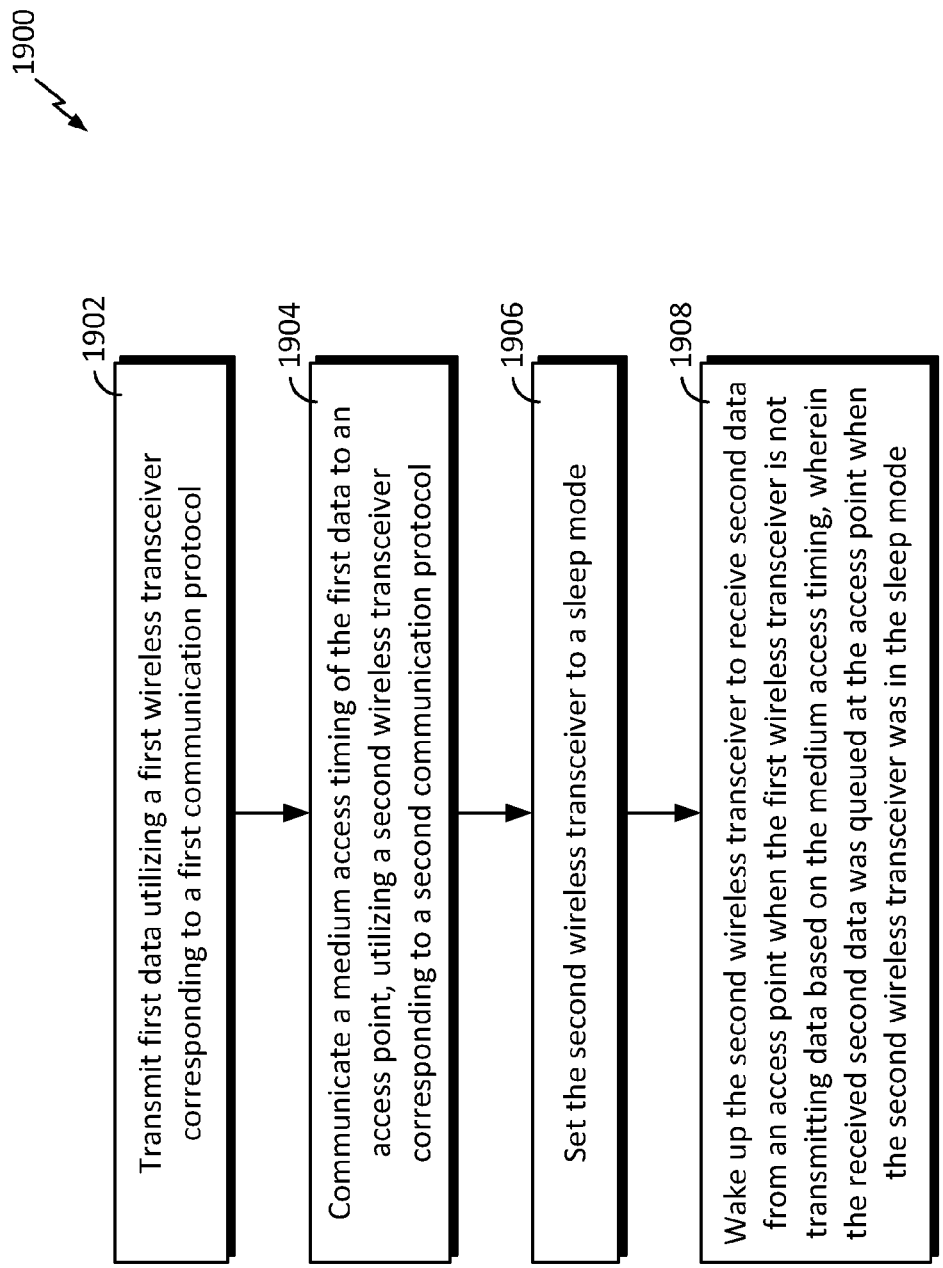
FIG. 19 is a flow chart illustrating a method of wireless communication operable at a communication device in accordance with an aspect of the disclosure.

FIG. 19 is a flow chart illustrating a method 1900 of wireless communication operable at a communication device 102 in accordance with an aspect of the disclosure. In step 1902, the device 102 transmits first data (e.g., BT data)

utilizing a first wireless transceiver (e.g., BT transceiver) corresponding to a first communication protocol (e.g., piconet protocol). In step 1904, the device 102 communicates a medium access timing of the first data to an access point (e.g., AP 110), utilizing a second wireless transceiver (e.g., WLAN transceiver) corresponding to a second communication protocol (e.g., 802.11 protocol). In step 1906, the device 102 sets the second wireless transceiver to a sleep mode. In step 1908, the device wakes up the second wireless transceiver to receive second data (e.g., WLAN data) from an access point when the first wireless transceiver is not transmitting data based on the medium access timing, wherein the received second data was queued at the access point when the second wireless transceiver was in the sleep mode.

Figure 20:
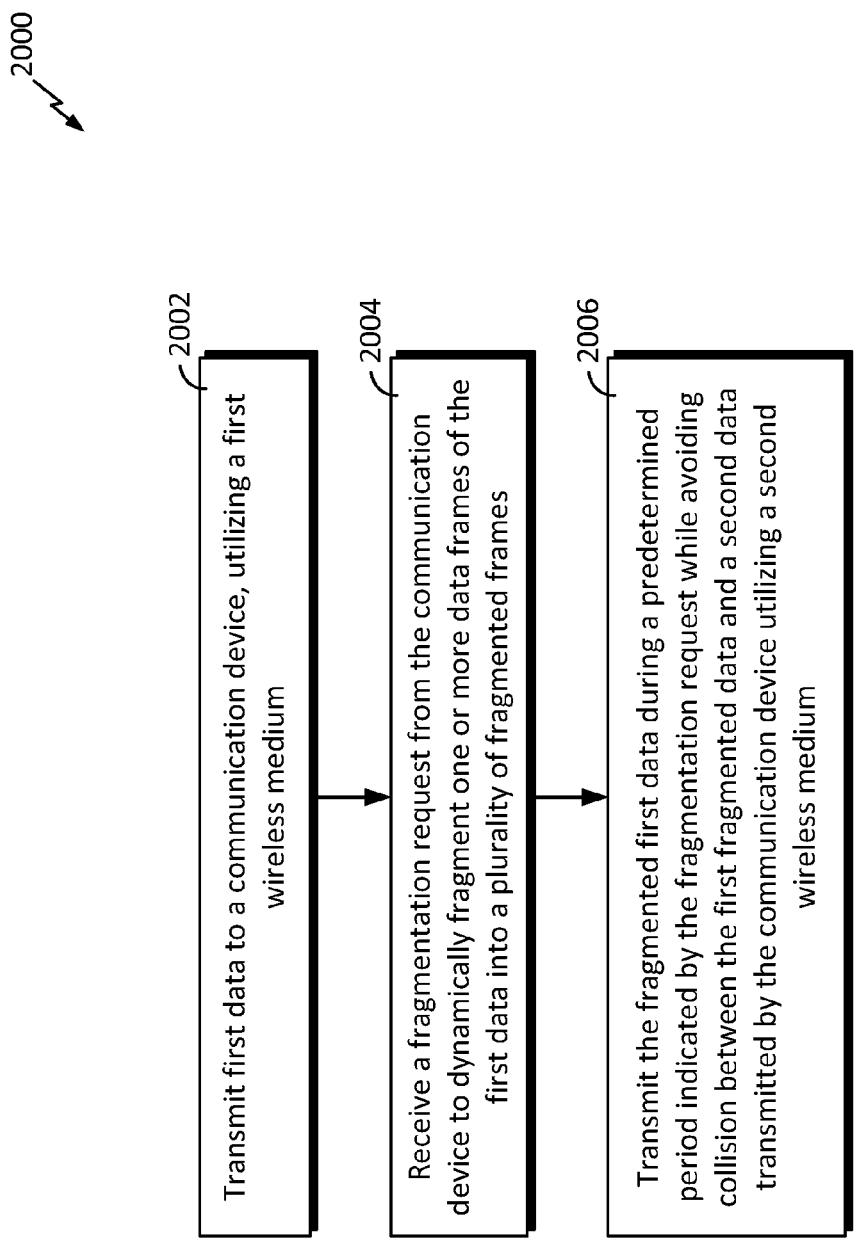
FIG. 20 is a flow chart illustrating a method of wireless communication operable at an access point in accordance with an aspect of the disclosure.

FIG. 20 is a flow chart illustrating a method 2000 of wireless communication operable at an access point 110 in accordance with an aspect of the disclosure. In step 2002, the access point 110 transmits first data (e.g., WLAN data) to a communication device 102, utilizing a first wireless medium (e.g., WLAN). In step 2004, the access point 110 receives a fragmentation request from the communication device to dynamically fragment one or more data frames of the first data into a plurality of fragmented frames. IN step 2006, the access point 110 transmits the fragmented first data during a predetermined period indicated by the fragmentation request while avoiding collision between the first fragmented data and a second data (e.g., BT data) transmitted by the communication device utilizing a second wireless medium (e.g., BT medium).

Several aspects of a telecommunications system have been presented with reference to an exemplary system using WLAN and BT. As those skilled in the art will readily appreciate, various aspects described throughout this disclosure may be extended to other telecommunication systems, network architectures and communication standards.

By way of example, various aspects may be extended to UMTS systems such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.16 (Wi-MAX), IEEE 802.20, Ultra-Wideband (UWB), and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claims is:

1. An apparatus for wireless communication, comprising:
   at least one processor;
   a first wireless transceiver coupled to the at least one processor, corresponding to a first communication protocol;
   a second wireless transceiver coupled to the at least one processor, corresponding to a second communication protocol; and
   a memory coupled to the at least one processor,
   wherein the at least one processor comprises:
   a first component configured to utilize the first wireless transceiver to transmit first data;
   a second component configured to utilize the second wireless transceiver to communicate a medium access timing of the first data to an access point;
   a third component configured to set the second wireless transceiver to a sleep mode; and
   a fourth component configured to wake up the second wireless transceiver to receive second data from the access point when the first wireless transceiver is not transmitting data based on the medium access timing, wherein the received second data was queued at the access point when the second wireless transceiver was in the sleep mode.

2. The apparatus of claim 1, wherein the first protocol comprises a piconet protocol, and the second protocol comprises a wireless local area network protocol.

3. The apparatus of claim 1, wherein the at least one processor further comprises a fifth component configured to receive a traffic indication map (TIM) from the access point, wherein the TIM indicates that at least one packet of the second data is queued at the access point.

4. The apparatus of claim 3, wherein the at least one processor further comprises a sixth component configured to transmit a power save poll to the access point in response to receiving the TIM, utilizing the second wireless transceiver.

5. The apparatus of claim 1, wherein the at least one processor further comprises a fifth component configured to receive a delivery traffic indication message (DTIM) from the access point, wherein the DTIM indicates the second data is broadcast data.

6. The apparatus of claim 1, wherein the at least one processor further comprises a fifth component configured to:
   measure a signal to interference ratio of the received second data; and
   adjust the transmission of the first data based on the measured signal to interference ratio of the received second data.

7. The apparatus of claim 6, wherein the fifth component is further configured to, at least one of:
  reduce a transmission power of the first data; or
  perform active interference cancellation to mitigate an interference imposed on the second data by the first data.

* * * * *